US00RE44144E

(19) United States
(12) Reissued Patent
Barrie et al.

(10) Patent Number: US RE44,144 E
(45) Date of Reissued Patent: Apr. 9, 2013

(54) EXPANDABLE BROADHEAD

(75) Inventors: Bruce Barrie, Waseca, MN (US); Ronald E. Way, Scottsdale, AZ (US); Carl J. Pugliese, Chandler, AZ (US)

(73) Assignee: Out RAGE, LLC, Proctor, MN (US)

(21) Appl. No.: 11/823,458

(22) Filed: Jun. 27, 2007

Related U.S. Patent Documents

Reissue of:
(64) Patent No.: 6,910,979
Issued: Jun. 28, 2005
Appl. No.: 10/688,542
Filed: Oct. 17, 2003

U.S. Applications:
(60) Continuation-in-part of application No. 10/601,681, filed on Jun. 23, 2003, now abandoned, which is a continuation-in-part of application No. 10/233,341, filed on Sep. 3, 2002, now Pat. No. 6,626,776, which is a division of application No. 09/798,578, filed on Mar. 3, 2001, now Pat. No. 6, 517,454.

(60) Provisional application No. 60/188,683, filed on Mar. 13, 2000.

(51) Int. Cl.
*F42B 6/08* (2006.01)
(52) U.S. Cl. ..... 473/583; 473/584
(58) Field of Classification Search ..... 473/583, 473/584
See application file for complete search history.

(56) References Cited

U.S. PATENT DOCUMENTS

| | | | |
|---|---|---|---|
| 2,212,345 | A | 8/1940 | Krieger |
| 2,289,284 | A | 7/1942 | Chandler |
| 2,568,417 | A | 9/1951 | Steinbacher |
| 2,684,852 | A | 7/1954 | Romeka |
| 2,816,765 | A | 12/1957 | Stockfleth |
| 2,859,970 | A | 11/1958 | Doonan |
| 2,925,278 | A | 2/1960 | Sweetland |
| 2,930,620 | A | 3/1960 | Brooks |
| 2,939,708 | A | 6/1960 | Scheib |
| 2,940,758 | A | 6/1960 | Richter |
| 3,000,635 | A | 9/1961 | Nieman |
| 3,036,395 | A | 5/1962 | Nelson |
| 3,036,396 | A | 5/1962 | Swails |
| 3,064,977 | A | 11/1962 | Zwickey |
| 3,138,383 | A | 6/1964 | McKinzie |
| 3,527,463 | A | 9/1970 | Turner |
| 3,578,328 | A | 5/1971 | Rickey |

(Continued)

OTHER PUBLICATIONS

New Archery Products Corp. ("NAP"), letter from A. Simo to R. Krause regarding Patent Nos. 6,517,454, 6,626,776, and 6,910,979; letter dated Jul. 22, 2011.

(Continued)

*Primary Examiner* — John Ricci
(74) *Attorney, Agent, or Firm* — Covington & Burling LLP; Andrea G. Reister; Gregory S. Discher

(57) ABSTRACT

A broadhead for mating with an arrow, includes a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming of a blade cutting edge of each blade outward relative to the broadhead body. A method of expanding an expandable broadhead is also included.

58 Claims, 11 Drawing Sheets

U.S. PATENT DOCUMENTS

| | | | |
|---|---|---|---|
| 3,618,948 | A | 11/1971 | McGlockin |
| 3,653,664 | A | 4/1972 | Gentellalli |
| 3,672,677 | A | 6/1972 | Moore |
| 3,738,657 | A | 6/1973 | Cox |
| 3,741,542 | A | 6/1973 | Karbo |
| 3,756,600 | A | 9/1973 | Maleski |
| 3,759,519 | A | 9/1973 | Palma |
| 3,854,723 | A | 12/1974 | Wilson |
| 3,881,730 | A | 5/1975 | Carella |
| 3,893,866 | A | 7/1975 | Hollingsworth |
| 3,897,062 | A | 7/1975 | Christensen |
| 3,910,579 | A | 10/1975 | Sprandel |
| 3,915,455 | A | 10/1975 | Savora |
| 3,941,059 | A | 3/1976 | Cobb |
| 4,006,901 | A | 2/1977 | Simo |
| 4,029,319 | A | 6/1977 | Christen |
| 4,036,499 | A | 7/1977 | Sherwin |
| 4,043,020 | A | 8/1977 | Hoggard |
| 4,093,230 | A | 6/1978 | Simo |
| 4,099,720 | A | 7/1978 | Zeren |
| 4,141,554 | A | 2/1979 | Sherwin |
| 4,146,226 | A | 3/1979 | Sorenson |
| 4,166,619 | A | 9/1979 | Bergmann et al. |
| 4,203,601 | A | 5/1980 | Simo |
| 4,210,330 | A | 7/1980 | Kosbab |
| 4,234,191 | A | 11/1980 | Erlandson |
| 4,254,958 | A | 3/1981 | Bateman, III |
| 4,341,391 | A | 7/1982 | Anderson |
| 4,381,866 | A | 5/1983 | Simo |
| 4,405,133 | A | 9/1983 | Cartwright, Jr. |
| 4,410,184 | A | 10/1983 | Anderson |
| 4,452,460 | A | 6/1984 | Adams |
| 4,504,063 | A | 3/1985 | LeBus |
| 4,505,482 | A | 3/1985 | Martin, Sr. |
| 4,529,208 | A | 7/1985 | Simo |
| 4,534,568 | A | 8/1985 | Tone |
| 4,558,868 | A | 12/1985 | Musacchia |
| 4,565,377 | A | 1/1986 | Troncoso, Jr. et al. |
| 4,576,589 | A | 3/1986 | Kraus et al. |
| 4,579,348 | A | 4/1986 | Jones |
| 4,601,710 | A | 7/1986 | Moll |
| 4,615,529 | A | 10/1986 | Vocal |
| 4,616,835 | A | 10/1986 | Trotter |
| 4,621,817 | A | 11/1986 | Musacchia |
| 4,643,435 | A | 2/1987 | Musacchia |
| 4,671,517 | A | 6/1987 | Winters |
| 4,676,512 | A | 6/1987 | Simo |
| 4,729,320 | A | 3/1988 | Whitten, III |
| 4,742,637 | A | 5/1988 | Musacchia |
| 4,807,889 | A | 2/1989 | Johnson |
| 4,924,619 | A | 5/1990 | Dowell |
| 4,932,671 | A | 6/1990 | Anderson, Jr. |
| 4,940,246 | A | 7/1990 | Stagg |
| 4,973,060 | A | 11/1990 | Herzing |
| 4,976,443 | A | 12/1990 | DeLucia |
| 4,986,550 | A | 1/1991 | Segovia |
| 4,998,738 | A | 3/1991 | Puckett |
| 5,033,220 | A | 7/1991 | Phelps |
| 5,044,640 | A | 9/1991 | DelMonte et al. |
| 5,046,744 | A | 9/1991 | Eddy |
| 5,057,082 | A | 10/1991 | Burchette, Jr. |
| 5,064,202 | A | 11/1991 | Barner |
| 5,066,021 | A | 11/1991 | DeLucia |
| 5,078,407 | A | 1/1992 | Carlston et al. |
| 5,082,292 | A | 1/1992 | Puckett et al. |
| 5,083,798 | A | 1/1992 | Massey |
| 5,090,709 | A | 2/1992 | Johnson |
| 5,100,143 | A | 3/1992 | Puckett |
| 5,102,147 | A | 4/1992 | Szeluga |
| 5,112,063 | A | 5/1992 | Puckett |
| D326,889 | S | 6/1992 | Garoutte |
| 5,137,282 | A | 8/1992 | Segar et al. |
| 5,160,148 | A | 11/1992 | Musacchia, Sr. |
| 5,172,916 | A | 12/1992 | Puckett |
| 5,178,398 | A | 1/1993 | Eddy |
| 5,178,399 | A | 1/1993 | Garoutte |
| 5,188,373 | A | 2/1993 | Ferguson et al. |
| D342,303 | S | 12/1993 | Johnson |
| 5,286,035 | A | 2/1994 | Ward |
| 5,322,297 | A | 6/1994 | Smith |
| 5,342,382 | A | 8/1994 | Brinkerhoff et al. |
| 5,372,588 | A | 12/1994 | Farley et al. |
| 5,385,572 | A | 1/1995 | Nobles et al. |
| 5,417,440 | A | 5/1995 | Barrie et al. |
| 5,439,231 | A | 8/1995 | Roberts et al. |
| D363,108 | S | 10/1995 | Johnson |
| 5,458,341 | A | 10/1995 | Forrest et al. |
| 5,472,213 | A | 12/1995 | Dudley |
| 5,482,293 | A | 1/1996 | Lekavich |
| 5,482,294 | A | 1/1996 | Sullivan et al. |
| 5,496,042 | A | 3/1996 | Craft et al. |
| 5,496,043 | A | 3/1996 | Ester |
| D370,246 | S | 5/1996 | Johnson |
| 5,564,713 | A | 10/1996 | Mizek et al. |
| 5,624,459 | A | 4/1997 | Kortenbach et al. |
| 5,636,845 | A | 6/1997 | Newnam |
| 5,649,706 | A | 7/1997 | Treat, Jr. et al. |
| D385,327 | S | 10/1997 | Delmonte |
| 5,803,844 | A | 9/1998 | Anderson |
| 5,803,845 | A | 9/1998 | Anderson |
| 5,820,498 | A | 10/1998 | Maleski |
| 5,857,930 | A | 1/1999 | Troncoso |
| 5,871,410 | A | 2/1999 | Simo et al. |
| 5,879,252 | A | 3/1999 | Johnson |
| 5,931,751 | A | 8/1999 | Cooper |
| 5,941,784 | A | 8/1999 | Mizek |
| 6,015,357 | A | 1/2000 | Rizza |
| 6,027,421 | A | 2/2000 | Adams, Jr. |
| 6,077,179 | A | 6/2000 | Liechty, II |
| 6,165,086 | A | 12/2000 | Liechty, II |
| 6,171,206 | B1 | 1/2001 | Liechty, II |
| 6,174,252 | B1 | 1/2001 | Mizek |
| 6,200,237 | B1 | 3/2001 | Barrie |
| 6,217,467 | B1 | 4/2001 | Maleski |
| 6,258,000 | B1 | 7/2001 | Liechty, II |
| 6,270,435 | B1 | 8/2001 | Sodaro |
| 6,283,880 | B1 | 9/2001 | Barrie |
| 6,287,223 | B1 | 9/2001 | Liechty, II |
| 6,287,224 | B1 | 9/2001 | Liechty, II |
| 6,290,903 | B1 | 9/2001 | Grace, Jr. et al. |
| 6,306,053 | B1 | 10/2001 | Liechty, II |
| 6,319,161 | B1 | 11/2001 | Martinez et al. |
| 6,322,464 | B1 | 11/2001 | Sestak |
| 6,394,919 | B1 | 5/2002 | Ossege |
| 6,398,676 | B1 | 6/2002 | Mizek |
| 6,428,433 | B1 | 8/2002 | Liechty, II |
| 6,428,434 | B1 | 8/2002 | Liechty, II |
| 6,517,454 | B2 | 2/2003 | Barrie et al. |
| 6,530,853 | B1 | 3/2003 | Giannetti |
| 6,540,628 | B1 | 4/2003 | Musacchia, Jr. |
| 6,554,727 | B1 | 4/2003 | Armstrong et al. |
| 6,558,280 | B1 | 5/2003 | Kuhn |
| 6,595,881 | B1 | 7/2003 | Grace, Jr. et al. |
| 6,626,776 | B2 | 9/2003 | Barrie et al. |
| 6,663,518 | B1 | 12/2003 | Kuhn |
| 6,669,586 | B2 | 12/2003 | Barrie et al. |
| 6,684,741 | B2 | 2/2004 | Blackston |
| 6,695,726 | B1 | 2/2004 | Kuhn |
| 6,695,727 | B1 | 2/2004 | Kuhn |
| 6,726,581 | B2 | 4/2004 | Muller |
| 6,739,991 | B1 | 5/2004 | Wardropper |
| 6,743,128 | B2 | 6/2004 | Liechty, II |
| 6,749,801 | B1 | 6/2004 | Grace, Jr. et al. |
| 6,755,758 | B2 | 6/2004 | Liechty, II |
| 6,793,596 | B1 | 9/2004 | Sullivan et al. |
| 6,830,523 | B1 | 12/2004 | Kuhn |
| 6,910,979 | B2 | 6/2005 | Barrie et al. |
| 6,918,848 | B2 | 7/2005 | Kuhn |
| 6,935,976 | B1 | 8/2005 | Grace, Jr. et al. |
| 6,939,258 | B2 | 9/2005 | Muller |
| 6,942,551 | B2 | 9/2005 | Mizek et al. |
| 6,942,588 | B2 | 9/2005 | Barrie |
| 6,997,827 | B1 | 2/2006 | Grace, Jr. et al. |
| 7,025,697 | B2 | 4/2006 | Mizek et al. |
| 7,037,222 | B2 | 5/2006 | Mizek et al. |
| 2001/0006916 | A1 | 7/2001 | Liechty, II |
| 2001/0036876 | A1 | 11/2001 | Barrie et al. |

| | | | |
|---|---|---|---|
| 2002/0055404 | A1 | 5/2002 | Liechty, II et al. |
| 2002/0065155 | A1 | 5/2002 | Liechty, II |
| 2002/0098926 | A1 | 7/2002 | Liechty, II |
| 2002/0128096 | A1 | 9/2002 | Muller |
| 2002/0151394 | A1 | 10/2002 | Arasmith |
| 2003/0004021 | A1 | 1/2003 | Barrie et al. |
| 2003/0022741 | A1 | 1/2003 | Muller |
| 2003/0073525 | A1 | 4/2003 | Liechty, II |
| 2003/0153417 | A1 | 8/2003 | Barrie et al. |
| 2003/0236141 | A1 | 12/2003 | Kuhn |
| 2004/0048704 | A1 | 3/2004 | Arasmith |
| 2004/0092342 | A1 | 5/2004 | Perkins, Sr. |
| 2004/0138016 | A1 | 7/2004 | Kuhn |
| 2004/0142778 | A1 | 7/2004 | Mizek et al. |
| 2004/0198540 | A1 | 10/2004 | Mizek et al. |
| 2006/0052191 | A1 | 3/2006 | Mizek et al. |

OTHER PUBLICATIONS

R. L. Rainey letter to A. Simo dated Aug. 1, 2011.
D. H. Pauley letter to R. L. Rainey regarding Reissue U.S. Appl. No. 11/823,458; letter dated Aug. 2, 2011.
R. L. Rainey letter to D. H. Pauley dated Aug. 17, 2011.
J. Fowler e-mail to D. Pauley dated Aug. 19, 2011, and related emails.
D. H. Pauley letter to R. L. Rainey regarding Reissue U.S. Appl. No. 11/823,458; letter dated Aug. 31, 2011.
Declaration of Bob Mizek to Establish date of Invention Prior to Critical date of U.S. Appl. No. 11/823,458; Declaration dated Aug. 31, 2011.
Declaration of Andy Simo to Establish date of Invention Prior to Critical date of U.S. Appl. No. 11/823,458; Declaration dated Aug. 31, 2011.
Declaration of Chris Kozlik to Establish date of Invention Prior to Critical date of U.S. Appl. No. 11/823,458; Declaration dated Aug. 31, 2011.
E-mail from D. Pauley to G. Discher, dated Sep. 13, 2011.
E-mail from A. Simo to R. Krause, dated Sep. 14, 2011.
E-mail from R. Krause to A. Simo, dated Sep. 16, 2011.
E-mail from A. Simo to R. Krause, dated Sep. 19, 2011, and related emails.
E-mail from R. Krause to A. Simo, dated Sep. 20, 2011.
E-mail with two (2) attachments from A. Simo to R. Krause, dated Sep. 22, 2011.
E-mail from Andy Simo to Rich Krause, dated Sep. 28, 2011.
E-mail from R. Krause to A. Simo, dated Sep. 28, 2011, and related email.
Request for Inter Partes Reexamination of United States Patent 6,626,776, filed Dec. 14, 2011.
Petition Under 37 C.F.R. § 1.182 and/or § 1.183, a Protest Under 37 C.F.R. § 1.291(a) with Exhibits 1-5, and Declaration of Robert Mizek Under 37 C.F.R. §1.132, initially submitted to the USPTO on Jan. 31, 2012 by Mr. Allan A. Fanucci.
Two photographs which are duplications of original photograph, taken of expandable broadheads of the same construction as those that were shown in the photograph provided with the email from rmizek@newarchery to B. Barrie, dated Jan. 30, 2001.
E-mail from rmizek@newarchery to B. Barrie, re: Amo Show; e-mail dated Jan. 30, 2001.
Stipulation for Dismissal Without Predudice, May 6, 2009.
Order for Dismissal Without Predudice, May 8, 2009.
Response to Office Action in Inter Partes Reexamination under 37 C.F.R. s 1.945 and M.P.E.P. s 2666, filed in the USPTO on Mar. 28, 2102 in case Control No. 95/001,854 filed Dec. 14, 2011.
Third Party Requester's Comments To Patent Owner's Reply of Mar. 28, 2012 Pursuant to 37 C.F.R. s 1.947, dated Apr. 27, 2012.
Plaintiff Out Rage LLC's Identification Of Asserted Claims And Accused Products, dated Feb. 3, 2012.
Action Closing Prosecution (nonfinal), mailed by the USPTO on May 21, 2102 in case Control No. 95/001,854 filed Dec. 14, 2011.
"New Products for 1997," Rich Walton's Industry News, 9 pp., http://www.bowhunting.net/richwalton/97newproducts.html.
"Bowhunting Tactics," Petersen's Bowhunting Magazine, Oct. 18, 2004, 5 pp., www.outdoorsbest.com.
"Broadhead Collecting—As Easy As A.B.C.C.," Stickbow.com, Copyright 2002, 8 pp.
Bowhunting Equipment Buyers Guide, 1997, 3pp.
Bowhunting World, Feb. 1997, 2 pp.
Bowhunting World: Equipment Guide '94, vol. 43, No. 5, Jul. 1994, 3 pp.
Bowhunting World: Bowhunting Guide '89-'90, vol. 38, No. 7, 2 pp., 1989-1990 edition.
*Field Logic* v. *G5 Outdoors,* No. 06cv01724 Defendant's Prior Art Chart (12 pages), of Jun. 27, 2007.

3
3
7
7
11
11a
13
14
11a
11b
11c
11s
12
13
13a
13b
13c
13d
13e
13g
14
14a
14b
14c
14d
14e
14g
14h
15
16

EXPANDABLE BROADHEAD

Matter enclosed in heavy brackets [ ] appears in the original patent but forms no part of this reissue specification; matter printed in italics indicates the additions made by reissue.

REFERENCE TO RELATED APPLICATIONS

[This application] *This application is a Reissue application of U.S. Pat. No. 6,910,979, filed Oct. 17, 2003 as Ser. No. 10/688,542, which is a Continuation-In-Part of application Ser. No. 10/601,681, filed Jun. 23, 2003, now abandoned, which* is a Continuation-In-Part of application Ser. No. 10/233,341, filed Sep. 3, 2002, now U.S. Pat. No. 6,626,776, *which is incorporated herein by reference,* which is a [Divisional Application derived from]*Division of* U.S. patent application Ser. No. 09/798,578 filed Mar. 3, 2001, now U.S. Pat. No. 6,517,454, *which is incorporated herein by reference,* which claims the benefit of U.S. Provisional Application No. 60/188,683 filed Mar. 13, 2000, [all of which are] *which is* incorporated herein by reference.

FIELD OF THE INVENTION

This invention relates generally to broadheads, which are often referred to as broadhead arrowtips or arrowheads but which, among users, are simply referred to as broadheads and more specifically to an expanding broadhead which has an inflight configuration and dimension with the blades retracted and which, upon striking a target, expands the blades outwardly to result in a larger entrance opening in the target.

BACKGROUND OF THE INVENTION

The use of broadheads is well known in the bow hunting art and various broadheads including both expanding and fixed blade types are available. The function of the expanding blade is to provide a relatively small, inflight dimension with the blades being outwardly moveable upon striking a target, to expand the blades to an open position. The fixed blade maintains its dimension during flight and when entering the target. The advantage of the small, inflight dimension of the expanding broadhead is the trueness of flight, which is available, as cross winds will not affect the flight, as they are at to do with a solid blade design. Typically, expanding prior art blades are hinged to the broadhead body at a rearward blade edge. In the retracted position, a portion of the forward blade edge is presented to the target. Upon striking the target each blade rotates outward about the hinge between about 90 and 180 degrees to the expanded position. What was the forward blade edge becomes the rearward blade edge in the expanded position. Such reaction and the sudden stopping of the blade in the expanded position imparts significant strikes on both the blades and on the hinge.

SUMMARY OF THE INVENTION

The blades of the broadhead embodying the invention disclosed herein relate to an expanding broadhead wherein the blades are forced longitudinally rearwardly upon striking a target and are slid within a capturing recess, either a slot or a groove, and being held within the same by a transversely extending or friction providing member positioned relative to a mass reducing guide within the blade such as a slot. As the blades are forced rearwardly, the rearmost ends of the same are shifted outwardly, either by a camming member configured in the capturing recess or by a retaining member disposed in a blade slot or both, to an expanded cutting position.

It is an object of the applicants' invention to provide an expanding broadhead wherein a multiple of blades are arranged for sliding movement within an equal number of passages through the broadhead body or multiple single blades, preferably three, are provided in separate, arcuately spaced recesses formed in the broadhead body such that the blades, in either arrangement, provide an inflight, collapsed position and, upon the broadhead striking a target, move longitudinally rearwardly and are cammed or guided outwardly into an expanded, cutting position.

It is a further object of the applicants' invention to provide an expandable broadhead wherein a pair of blades are arranged for sliding movement within a single passage formed through the body of the broadhead and the blades are each provided with a guide element such as a slot formed in the blade, which slot in cooperation with a retaining member allows for rearward movement and outward shifting of the rear of the blades into their expanded cutting position.

It is a further object of the applicants' invention to provide an expandable broadhead wherein the blades thereof are provided with a longitudinally extending slot of selected configuration to assist in outward camming of the rear of the blades as they are moved rearwardly upon striking a target.

It is a further object of the applicants' invention to provide an expandable broadhead wherein, preferably, three individual blades are provided in arcuately spaced grooves or slots formed in the broadhead body and are held and retained therein allowed to move rearwardly upon the broadhead striking a target with guide means provided between each groove or slot and a respective blade to allow for outward movement of the rear end of the blade upon striking a target.

These and other objects and advantages of the applicants' invention will more fully appear from a consideration of the accompanying drawings and description.

The present invention is a broadhead for mating with an arrow and includes a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming of a blade cutting edge of each blade outward relative to the broadhead body. The present invention is further a method of expanding an expandable broadhead.

DETAILED DESCRIPTION OF THE DRAWINGS

Figures 1, 2, 3:
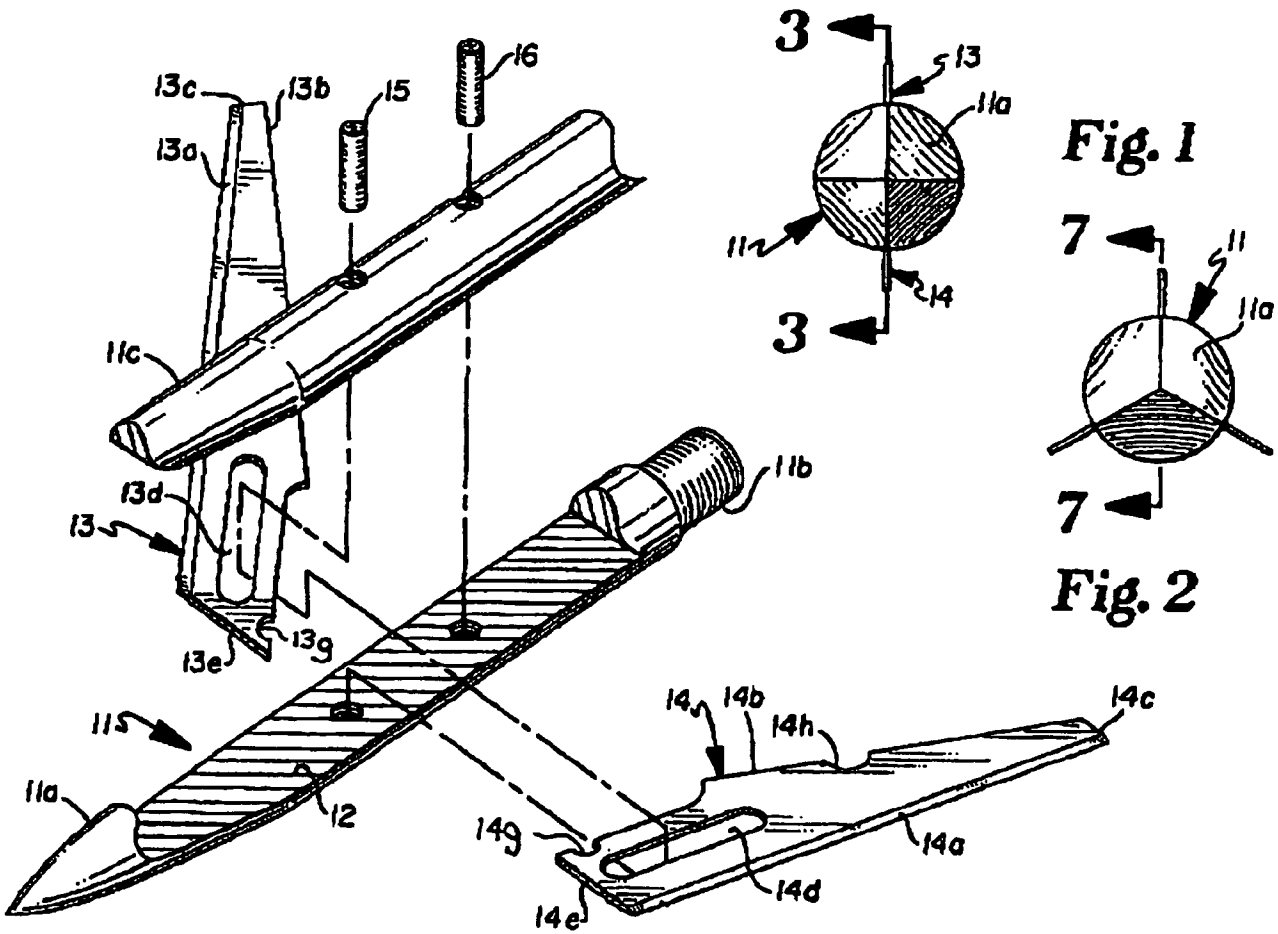
FIG. 1 is a front view of an expanding broadhead embodying the concepts of the applicants' invention wherein the broadhead is provided with a pair of blades.
FIG. 2 is a front view of an expanding broadhead embodying the concepts of the applicants' invention wherein the broadhead is provided with at least three accurately spaced blades, it being understood that this number may be increased.
FIG. 3 is an exploded view of the expanding broadhead taken substantially along Line 3-3 of FIG. 1, with portions thereof separated for ease of description.

As illustrated in the various views, the broadhead 10 of the present invention may take a number of forms, which are basically the same in their inventive concept. The first of the forms, shown in FIGS. 1, 3, 4, 5, and 6 provides a pair of blades which are mounted within a singular, longitudinally extending passage which is formed entirely through the body of the broadhead. The second of the forms, shown in FIGS. 2, 7, 8, 9, and 10 provides, preferably, three blades, spaced arcuately about the body of the broadhead. In either form, the blades are provided with means to retain at least the front end of the blades within the passage or groove during movement of the blades and are provided with a mass or weight reducing blade guiding slot which guides and limits the movement thereof as the blade is moved rearwardly and expanded outwardly when striking the target. Further embodiments are depicted in FIGS. 11-15.

In the first form of the invention as illustrated in FIGS. 1, 3, 4, 5, and 6, broadhead body 11 is provided with a front, target penetrating end 11a and a rear arrow shaft attachment end 11b. The body 11 is provided with a longitudinally extending, transverse passage 12 entirely therethrough with a pair of blades 13, 14 mounted therein. The target penetrating end 11a may take any of several known forms such as conical, faceted, straight taper or razor insert tip blade 26, as depicted in FIG. 11.

Figure 11:
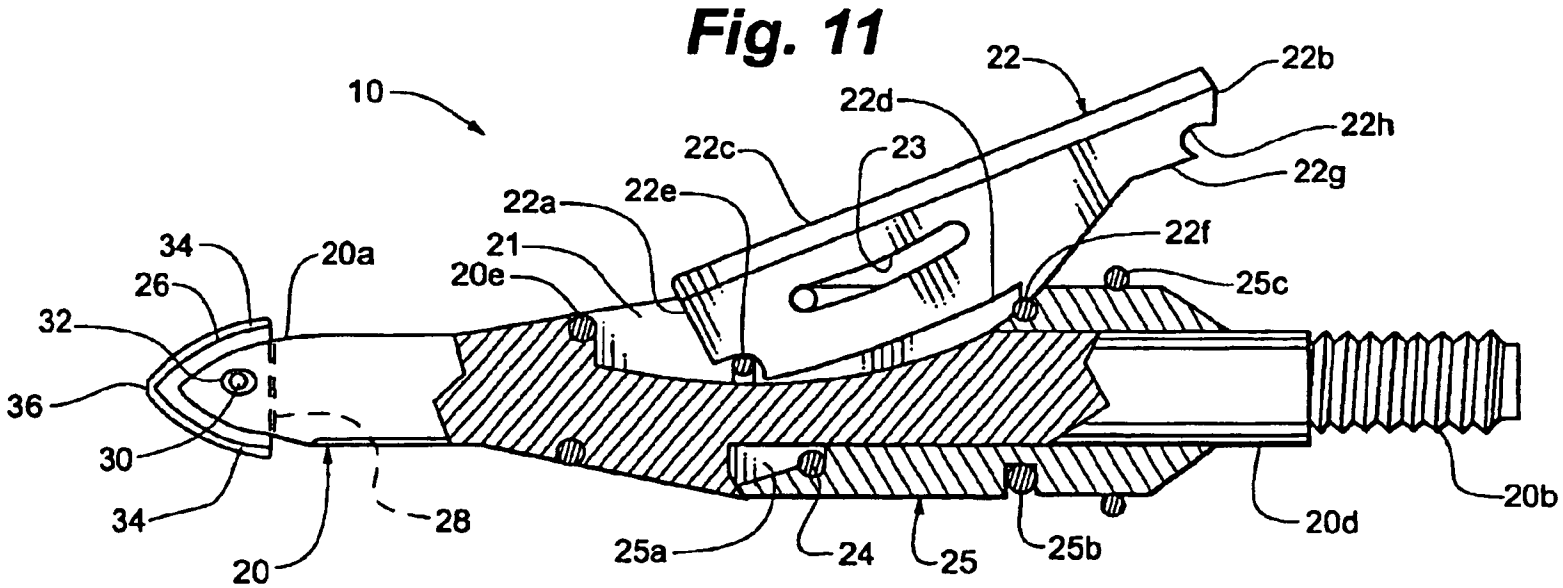
FIG. 11 is a side view of the broadhead of FIG. 9 with a tip blade.

The tip blade 26 of FIG. 11 is disposed in a transverse slot 28 defined in the target penetrating end 20a. The tip blade 26 is held in position by a pin 30 disposed in a bore 32 defined transversely through the penetrating end 20a. It could be held in position by bonding, welding, or other suitable means. A corresponding bore (not shown) is defined through the tip blade 26 and is in registry with bore 32. The tip blade 26 has a pair of arcuate cutting edges 34 terminating in a leading point 36. The cutting edges 34 extend radially outward from the exterior margin of the penetrating end 20a.

In FIG. 3, one side 11c of body 11 has been broken away from the remainder of the body 11 to illustrate the blades 13, 14 as they would be mounted therein. It should be appreciated that the body 11 may actually be provided with a removable side, such as 11c, which would be attachable to the remainder of the body 11.

Each of the blades 13, 14 includes an outwardly directed cutting surface 13a, 14a and a camming surface 13b, 14b, opposite such cutting surface 13a, 14a with a locating cutout or notch 13c, 14c formed at the rear of the camming surface 13b, 14b which will locate the blades 13, 14 for the inflight position. Each of the blades 13, 14 also includes a mass or weight reducing, longitudinally extending slot 13d, 14d which lies between surface 13a, 13b, 14a, 14b and, as is shown, may be parallel to cutting surface 13a, 14a.

A first transversely positioned, blade locating and retaining member 15, such as a pin or screw, extends entirely through the body 11 and through slots 13d, 14d to retain the blades 13, 14 within the body passage 12. Apertures, not numbered, receive such member 15. This member 15 allows longitudinal, rearward movement of blades 13, 14 within passage 12 and allows the rear ends 13f, 14f of the blades 13, 14 to expand outwardly into the penetrating position but does not allow the blades 13, 14 to be removed from passage 12 without removal of the member 15.

A second transversely positioned pin or screw 16 extends entirely through body 11 and passage 12 to provide a cam which is received into cutout or notch 13c, 14c when the blades 13, 14 are in their inflight or collapsed position and which acts against camming surfaces 13b, 14b as the blades 13, 14 are forced rearwardly by abutment of their forward ends 13e, 14e against a target to force the rear ends 13f, 14f of the blades 13, 14 outwardly into cutting position.

To hold the blades 13, 14 in their inflight position, a notch 13g, 14g is formed in the camming edges 13b, 14b of the blades 13, 14 adjacent the forward ends 13e, 14e thereof and a blade retaining member, breakable or unbreakable, or a friction member 17 is received into such notches 13g, 14g to hold the blades 13, 14 in collapsed position.

Figure 5:
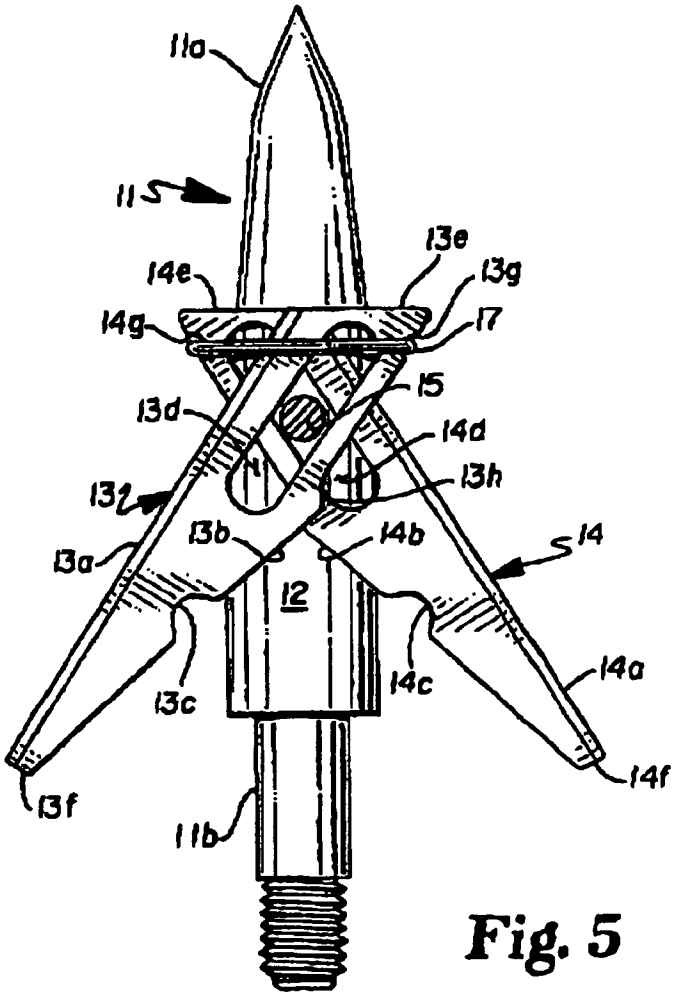
FIG. 5 is a view similar to FIG. 4 illustrating the expanding bladed of the broadhead in a partially expanded position.
Figure 4:
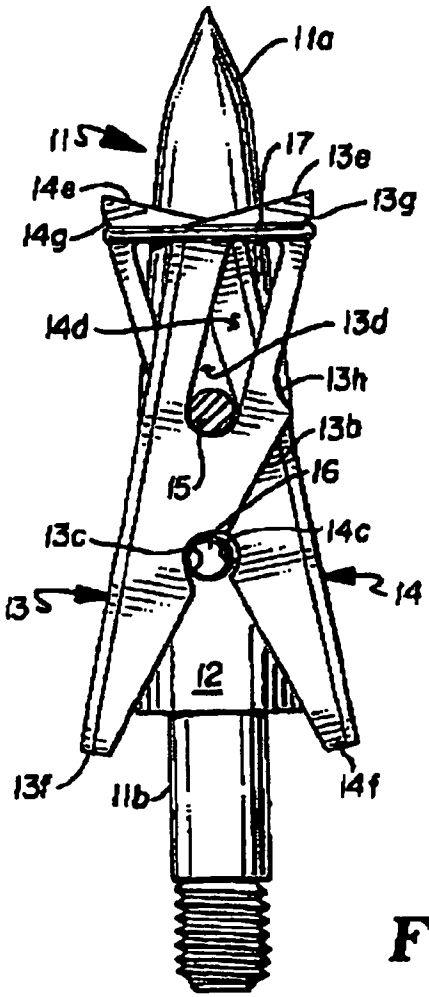
FIG. 4 is a view taken substantially along line 3-3 of FIG. 1 illustrating the expanding blades of the broadhead in their inflight position.

As illustrated, particularly in FIGS. 4 and 5, the forward ends 13e, 14e of blades 13, 14 extend outwardly from the radial dimension of the body 11 such that these ends 13e, 14e will abut with the target upon the broadhead 10 striking the same to force the blades 13, 14 rearwardly against cam pin 16 to cause the rear ends 13f, 14f of the blades 13, 14 to move into an expanded cutting position where their increased diameter will enlarge the target opening to insure animal kill.

To hold the blades in their expanded position and prevent their return, lugs 13h, 14h are provided on the camming surfaces 13b, 14b. These lugs 13h, 14h will, when the blades 13, 14 are at their expanded position, lock against pin 16 to prevent return of the blades 13, 14. However, the blades may be so designed that upon retrieval of the arrow from the target, the blades 13, 14 will be able to continue rotation about pin 15 such that the blades 13, 14 and their canning surfaces 13b, 14b will be forwardly directed to prevent barbing of the broadhead 10 with the wound area which is illegal in many states.

The use of this form of the broadhead 10 should be obvious to anyone skilled in the art. The blades 13, 14 are placed in their forwardmost position with the notches or cutouts 13c, 14c in registration with cam member 16. The holding member 17 is then arranged within notches 13g, 14g to hold the blades 13, 14 in what has been termed an inflight position. Upon the broadhead striking and penetrating a target, the broadhead 10 will enter the target and the forward ends 13e, 14e of the blades 13, 14 will come into contact with the target to force the blades 13, 14 rearwardly and continued penetration will continue such rearward blade movement. As the blades 13, 14 move rearwardly, the camming surface 13b, 14b, riding against the camming element 16 will force the rear ends 13f, 14f outwardly to target cutting position to enlarge the penetration aperture with the blades 13, 14 being prevented from returning due to engagement of lug 13h, 14h with pin 16. The holding member 17, if a non-reusable type is used, will normally be cut by the blade cutting surfaces 13a, 14a as member 17 is driven rearwardly and, if not so cut, would be available for next use of the broadhead 10. Removal of the blades 13, 14 from the target with the permitted continued movement thereof has been explained.

Figure 6:
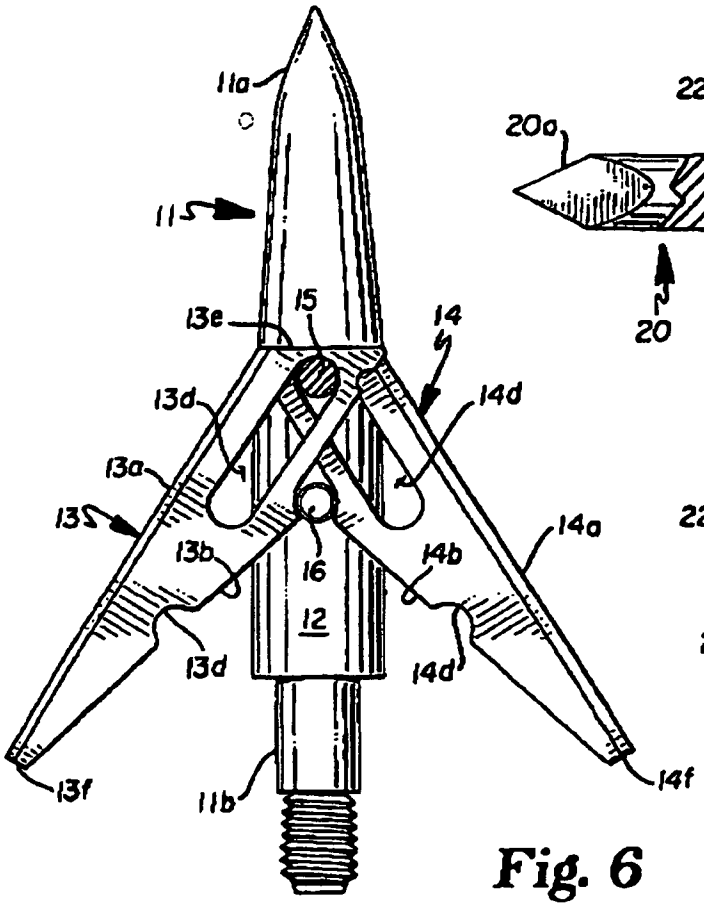
FIG. 6 is a view similar to FIGS. 4 and 5 and illustrating the expanding blades in their fully expanded position.

This sequence of blade movement and expansion is illustrated in FIGS. 4, 5 and 6 with the exception of the continued movement of the blades 13, 14 for removal from the target.

Figure 7:
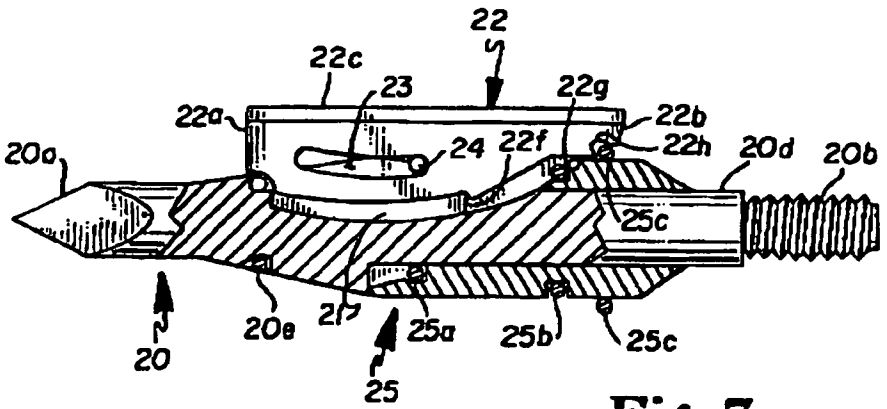
FIG. 7 is a view taken substantially along Line 7-7 of FIG. 2 showing a single blade of the multiple blade form of the invention in inflight position.
Figure 10:
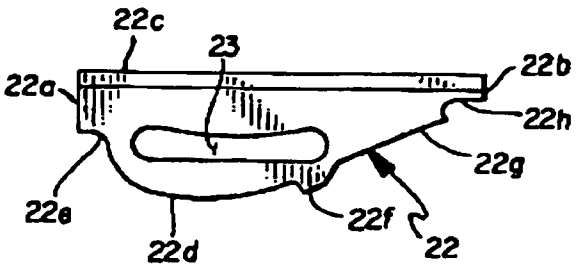
FIG. 10 is a side elevation view of the blade that is illustrated in FIGS. 2, 7, 8, and 9.
Figure 8:
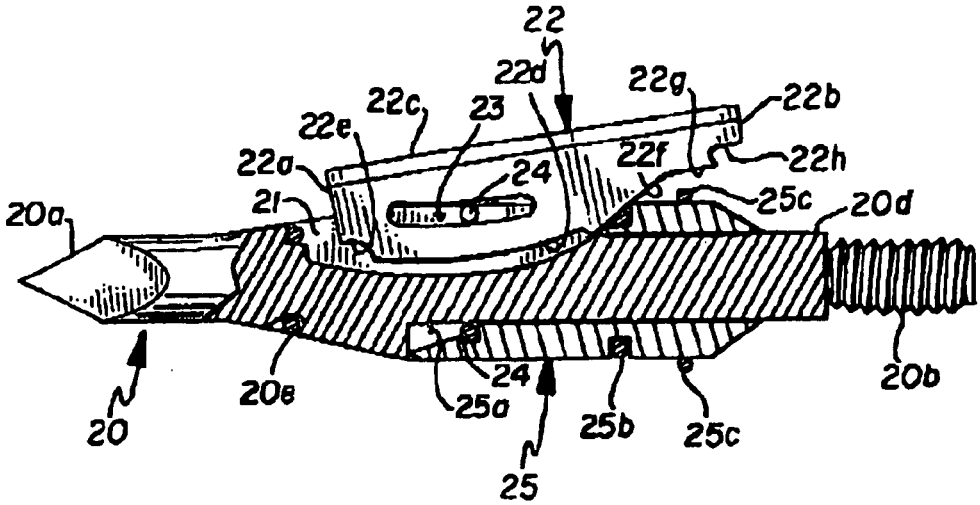
FIG. 8 is a view similar to FIG. 7 illustrating the expanding blade in a partially expanded position.
Figure 9:
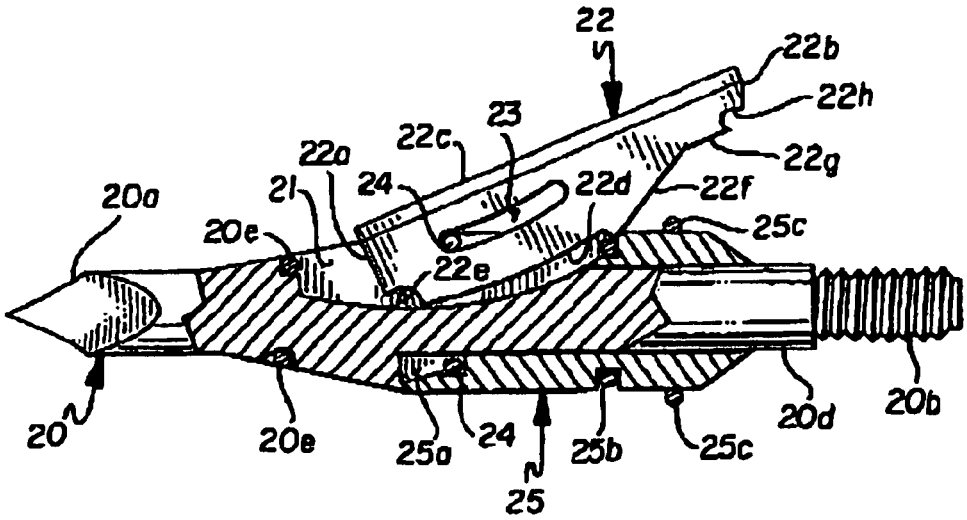
FIG. 9 is a view similar to FIGS. 7 and 8 illustrating the expanding blade in its fully expanded position.

A second form of the invention is sequentially shown in FIGS. 7, 8, and 9 with a separate blade being illustrated in FIG. 10. This form of the invention does not depart from the scope of the invention illustrated and described hereinabove but utilizes a different mechanical action to accomplish the same results.

In this form of the invention a number of blades 22 may be, preferably arcuately, spaced about a broadhead body 20, by providing grooves 21 partially formed into the body 20 with means to retain the blades 22 in such grooves 21 while permitting rearward movement and resulting in outward expansion of the rear ends thereof as a result of striking and entering a target to, again, enlarge the entry aperture formed in the target. Although the blades 22 are illustrated as being in alignment with the axis of the broadhead 10, it should be obvious that the blades 22 may be arranged angularly therewith without departing from the scope of the invention, as discussed in greater detail with respect to FIGS. 12-15, below.

The broadhead 10 provides a longitudinally extending body 20 having a forward, target penetrating end 20a with the variations of shape as stated above and a rear arrow shaft mounting end 20b. It should be understood that a number of blades 12, preferably three, may be arcuately spaced on a broadhead body 20 and the selected drawings illustrate only one such blade and one groove 21 to receive the same.

Each of the blades 22 includes an exterior cutting surface 22c with an inner surface 22d that has no required, defined shape other than to provide a first, closed or inflight, locking notch 22e adjacent the front end 22a thereof, a second, expanded or cutting, locking lug 22f, a flat rest surface 22g adjacent the rear end 22b thereof and a second inflight holding notch 22h at the end of the rest area, adjacent the rear end 22b. Both notches 22e, 22h may be utilized or a singular one may be used.

In order to maintain the blades 22 in the respective grooves 21 and permit longitudinal movement thereof, a weight or mass reducing slot 23 is formed transversely of the blades 22 and, in the form shown, this slot 23 is, preferably, arcuately formed such that as the blades 22 are moved rearwardly, they will move in an arc guided and held by a retaining member 24. It is understood that slot 23 can be any number of shapes, including triangular and straight on a first side and curved on a second side To facilitate assembly of this form of the broadhead 10, applicants provide a structure, which includes a second body part 25. To receive this second body part 25, the primary body 20 provides an area of reduced cross section 20d along a portion thereof and second body part 25 is fitted thereon. The frontal portion 25a of body part 25 provides an internal shoulder to receive blade retaining member 24. Retaining member 24 may, as in the form shown, constitute a split ring such that it may be introduced into the slots 23 of the blades 22 to retain the same while permitting movement thereof. Individual pins or other elements, for retaining the individual blades could be utilized and would provide the same attachment of blades to body. A one-piece unit with similar retaining means may be used without departing from the scope of the invention.

With this slot 23, retaining member 24 relation, it should be obvious that as the blades 22 are moved rearwardly, the blades 22 will move in accordance with the arcuate slot 23 to force the rear end 22b outwardly from the body 20 into the entrance hole enlarging position.

As illustrated, an open position locking member 25b, which may take the form of a ring is provided on the second body part 25 and as the blade 22 moves therepast, the aforesaid lug 22f will engage the same and prevent inward or return movement of the blade 22 and hold the same in the open, cutting position.

When the blades 22 are in the inflight position, the first mentioned blade notch 22e is received about a lock member 22e that, again, may be in the form of a selected ring on body 20. This lock member 20e, notch 22e relation eliminates the retainer 17 of the first form of the invention and is simply another method for retaining the inflight position.

In the inflight position, the aforementioned rest surface 22b will rest upon the open lock member 25b and the rearmost notch 22h will lock against and to an additional, selected, ring member 25c. Lock can also be effected by the blade 22 being in an interference, frictional fit in the body groove 21, the tolerance between the width of the blade 22 and the width of the body groove 21 being controlled such that the frictional fit is made. Rearward movement of the blade 22 will override the lock and, as stated a single such lock may be utilized.

The function of this form of broadhead should be obvious from the sequential motion Figures, namely, FIGS. 7, 8 and 9. The blades 22 will be within the body groove 21 with frontal notch 22e engaging body ring 20e and rear notch 22h engaging ring 25c. As the broadhead enters the target, the front end 22a of blade 22 will contact the target surface and continued movement of the broadhead into the target will force the blade 22 rearwardly past all inflight lock elements to be guided by the formed slot 23. Such movement will force the blade 22 rear end 22b into radially outwardly expanded position.

A single blade encompassing the second form of the invention is illustrated in FIG. 10 bearing the same indicia utilized in describing the operational movement of the blade 22.

This form of the invention will also allow for continued movement of the blades to prevent the aforementioned barbing effect.

The broadhead provided herein, of either form, accomplishes blade expansion through two related and relatively simple mechanical arrangements, which eliminate the normally provided complex hinged expansion systems of the prior art.

A further embodiment of the broadhead 10 of the present invention is depicted in FIGS. 12-16. The broadhead 10 has three extendable blades, but it is understood that more blades may be employed. Consistent with the previous embodiments, the blades are longitudinally translatable from a retracted, inflight position to an extended penetrating position. The longitudinal translation of the blades effects camming of the blade cutting edge outward relative to a broadhead body.

The broadhead 10 is depicted without the tip or threads for easily depicting the relationship of the blades and the broadhead body.

The broadhead 10 has an elongate generally cylindrical broadhead body 32. The body 32 is preferably formed of solid stock without a central longitudinal bore or the like. The body 32 has a tip end 34 and an opposed rear end 36, attachable to an arrow shaft. It is understood that the tip end 34 may include any of the aforementioned tip structures. Additionally, it is understood that the rear end 36 may be machined for joining with an arrow shaft, as previously noted. A longitudinal axis extends centrally through the body 32, intersecting the very tip of the tip end 34.

Three blade recesses 38 are defined in the broadhead body 32 and are equiangularly displaced around the longitudinal axis 76. The blade recess 38 may be a slot or a groove, a slot having two inlets and a groove having a single inlet with a blind bottom. In the embodiment of FIGS. 12-16, the blade recess 38 is an offset slot 40. Each of the offset slots 40 is parallel to the longitudinal axis 76 and displaced therefrom. Each offset slot 40 has a first inlet 42 and a second inlet 44. A bridge 46 extending between the inlets 42, 44, forms the inlets 42, 44.

A blade 50 is disposed in each of the blade recesses 38. The blades 50 are preferably similarly shaped having a generally triangular shape. A first generally straight edge is the cutting edge 52. The cutting edge 52 has a very sharp razor-type edge defined thereon.

The second edge of each of the blades 50 is a camming edge 54. The camming edge 54 has a generally curved shape with a relatively blunt margin. The camming edge 54 joins the cutting edge 52 at a rearwardly disposed point 56 at respective first ends thereof. An impact edge 58 forms the third side of each of the blades 50. The impact edge 58 is disposed opposite the point 56. The impact edge 58 joins a second end of the respective cutting edge 52 and camming edge 54. The impact edge 58 presents a relatively blunt edge margin.

Each of the blades 50 has a slot 60 defined therein. The slot 60 reduces the mass of the blade 50, acts as a means of retaining the blade 50 to the body 32, and further acts to at least assist in effecting a camming motion of the cutting edge 52 of the blade 50 during rearward longitudinal translation of the blade 50.

The slot 60 in the embodiment of FIGS. 12-16 is formed by two edges. The first such edge is a straight edge 62 that runs generally parallel to the cutting edge 52. The second edge is a generally arcuate edge 64 that extends inward from the straight edge 62, proximate the camming edge 54. As noted above, other shapes of the slot 60 are within the scope of the invention.

A retaining member 66, preferably pin or screw, retains each blade 50 to the body 32. The pin 66 is disposed in a bore 68 defined in the bridge 46. The pin 66 extends through the slot 60 and terminates in a blind bore (not shown) defined in the body 32 in registry with the bore 68.

Figure 15:
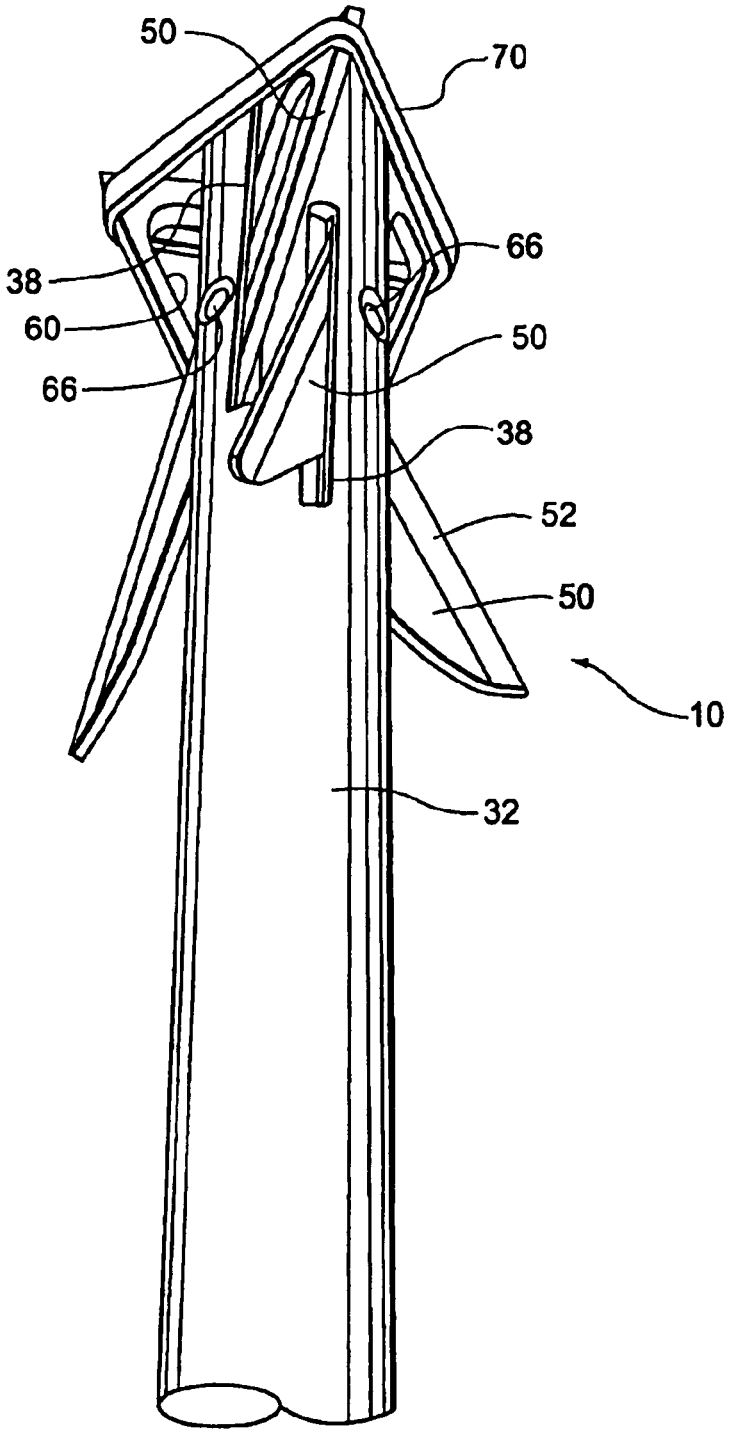
FIG. 15 is a perspective view of the broadhead of FIG. 12 in the retracted, inflight position.
Figure 16:
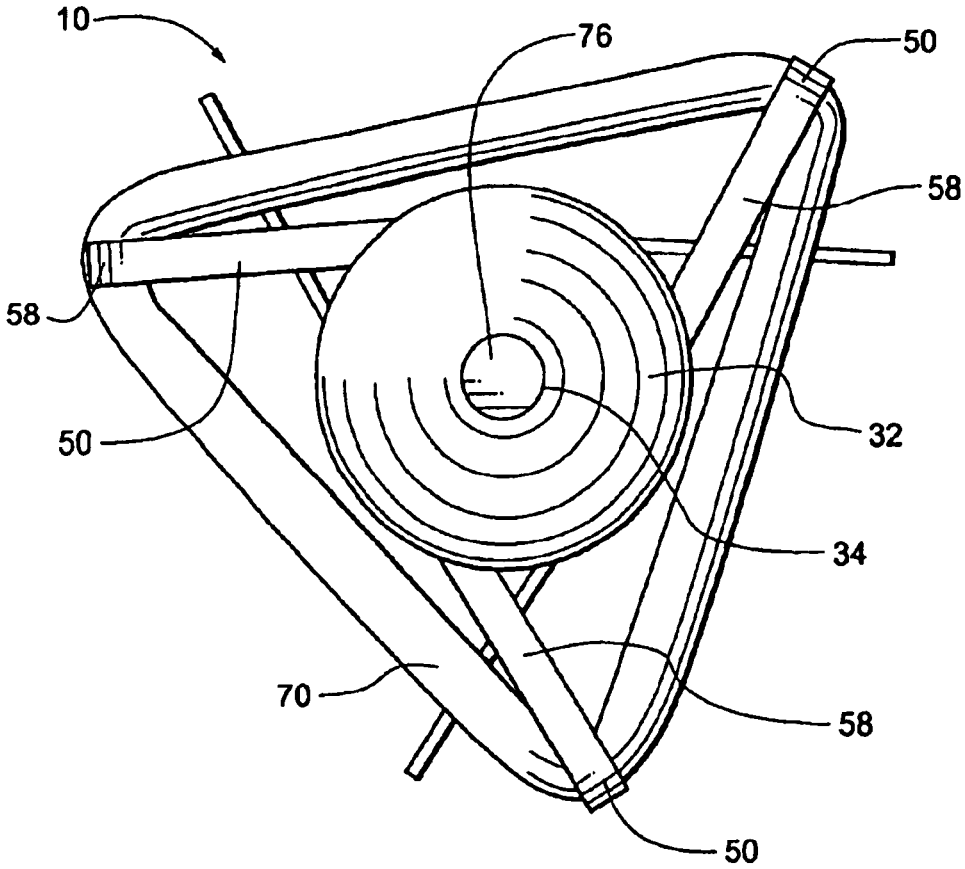
FIG. 16 is an end elevational view of the tip end of the broadhead of FIG. 15.

As depicted in FIGS. 15 and 16, an elastic restraint 70 extends around the body 32 and captures the camming edge 54 of the blades 50 proximate the intersection of the camming edge 54 with the impact edge 58.

In operation, at impact with an object, the tip end 34 of the broadhead 10 effects the first penetration of the object. The impact edge 58 of each of the blades 50 next comes into contact with the object. The impact edge 58 being relatively blunt takes the force of impact with the object and commences driving the blades 50 longitudinally rearward. This motion either cuts or breaks the restraint 70, freeing the blades 50 to translate longitudinally rearward.

Figure 12:
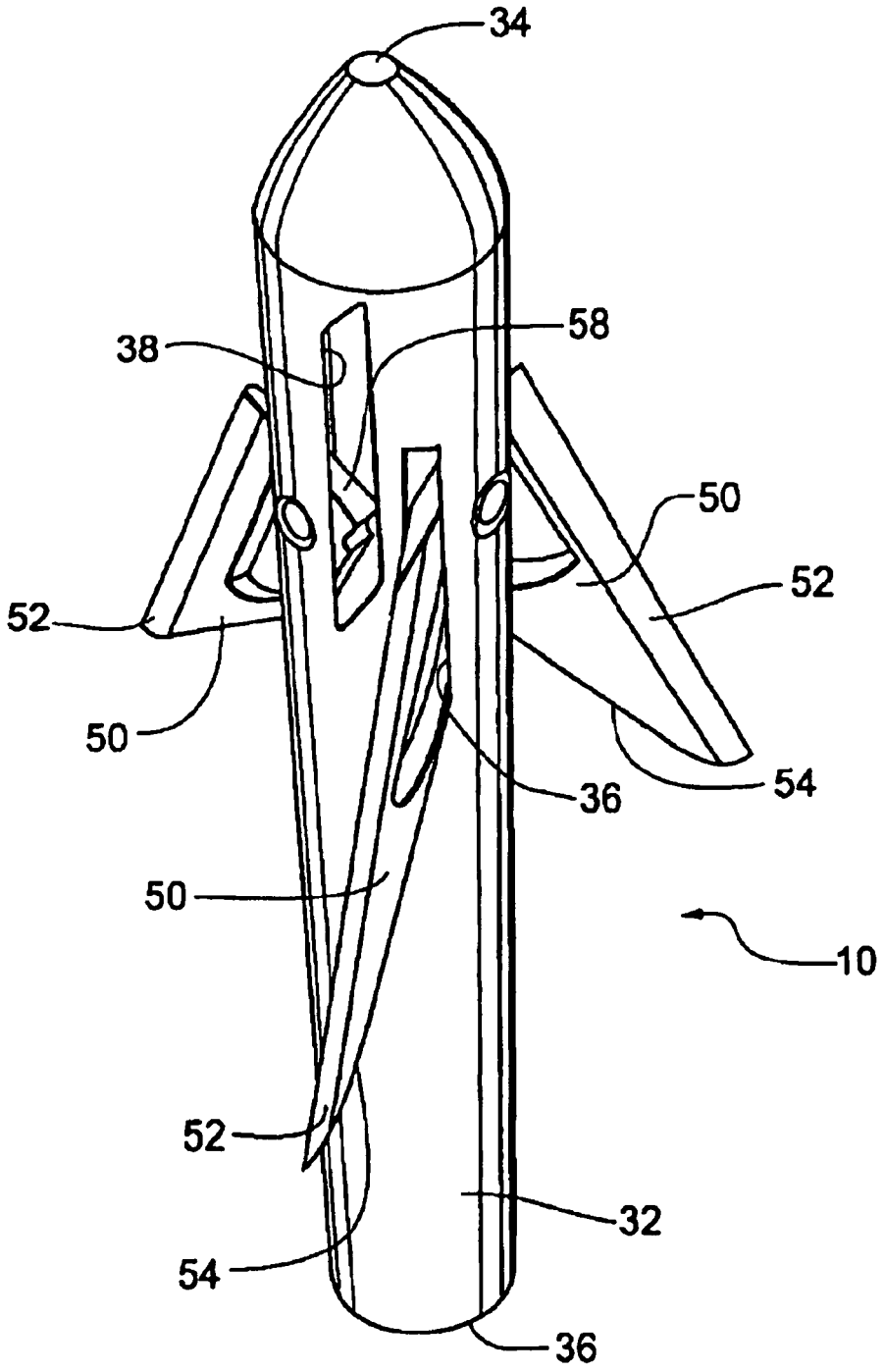
FIG. 12 is a perspective view of a further embodiment of the broadhead of the present invention in the extended, penetrating position.
Figure 13:
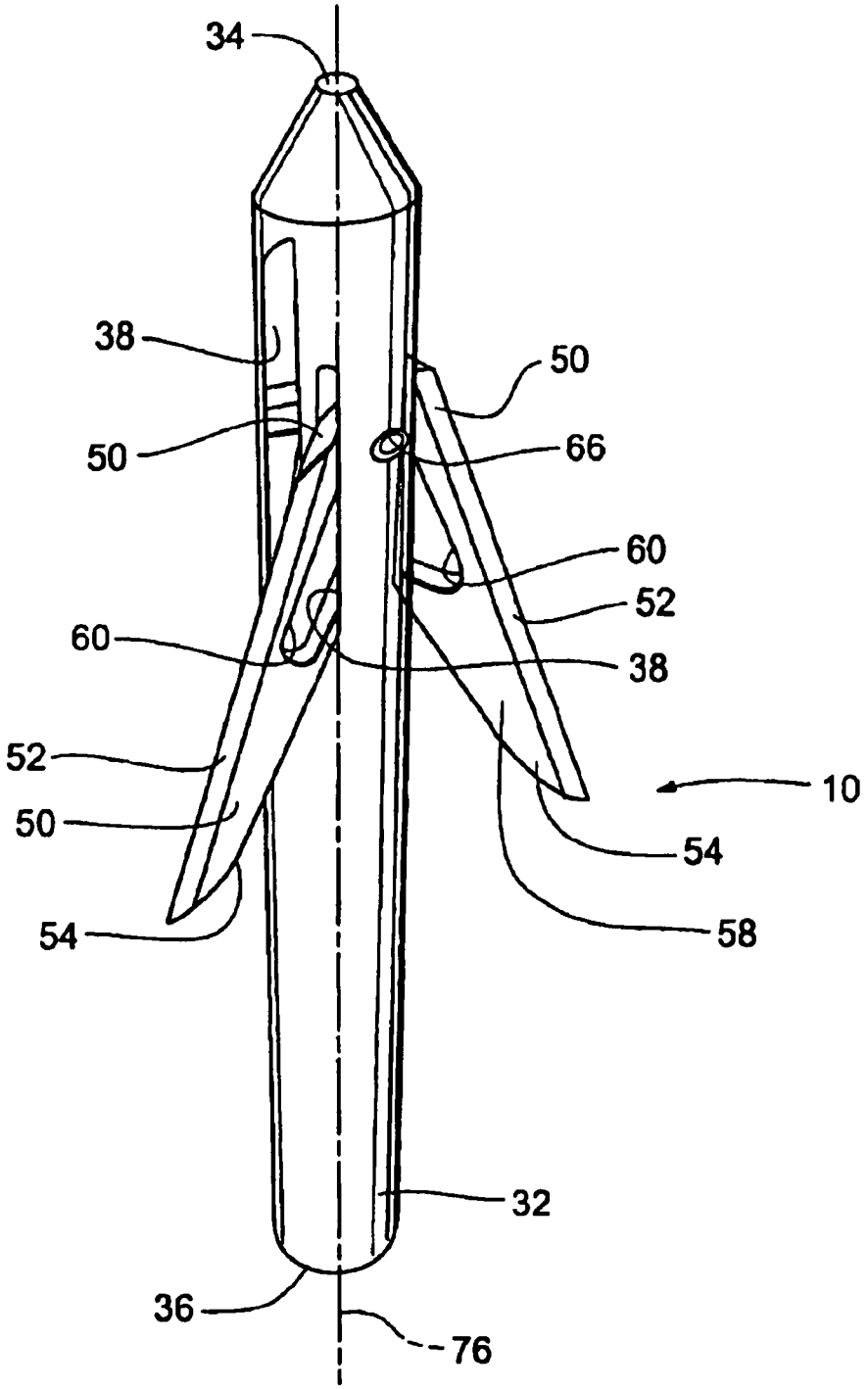
FIG. 13 is a further respective view of the broadhead of FIG. 12.
Figure 14:
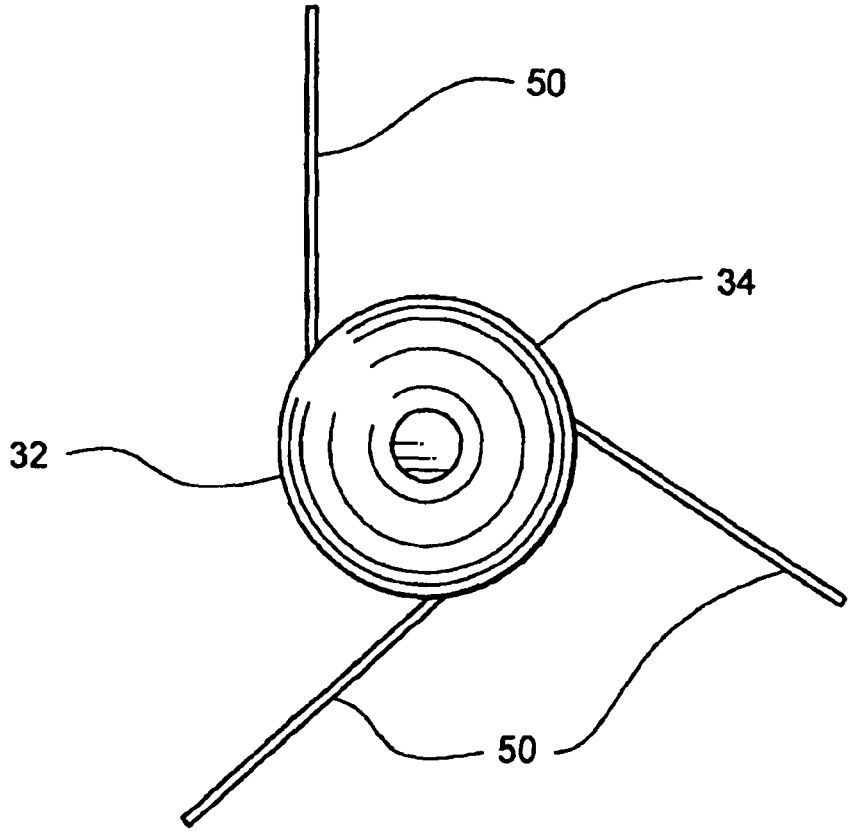
FIG. 14 is an elevational view of the tip end of the broadhead of FIG. 12.

Such translation effects camming of the cutting edge 52 outward from the inflight, retracted position of FIGS. 15 and 16 to the extended, penetrating position of FIGS. 12-14. The camming is effected by the pin 66 bearing on the arcuate edge 64 of the slot 60 as well as the camming edge 54 of the blade 50 riding on the rearward margin of the offset slot 40.

Figure 17:
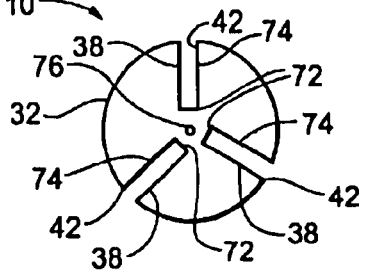
FIG. 17 is a sectional view of a broadhead having a further embodiment of the blade recess position.

There are many options available for forming the blade recess 38 in the body 32. In the depiction of FIG. 17, there are three blade recesses 38 defined in the body 32. In this instance, the blade recesses 38 are equiangularly, radially displaced around the body 32. Each of the blade recesses 38 is a groove 74. The groove 74 has a first inlet 42 and a blind bottom 72.

Figure 18:
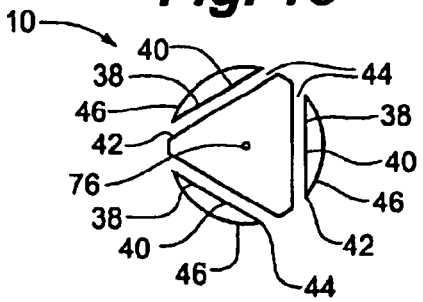
FIG. 18 is a sectional view of a broadhead depicting the blade recess position of the broadhead of FIGS. 12-16.

The depiction of FIG. 18 is of a broadhead 10 having a blade recess position similar to that depicted in FIGS. 12-16. Each of the blade recesses 38 is an offset slot 40 that runs parallel to the longitudinal axis 76 of the body 32.

Figure 19:
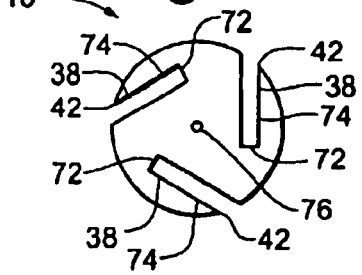
FIG. 19 is a sectional view of a broadhead having an additional embodiment of the blade recess position.

The depiction of FIG. 19 is of a broadhead 10 in which the blade recesses 38 are grooves 74. In this case, the grooves 74 are offset from the longitudinal axis 76. Each groove 74 has two generally parallel, spaced apart side margins and a blind bottom margin.

Figure 20:
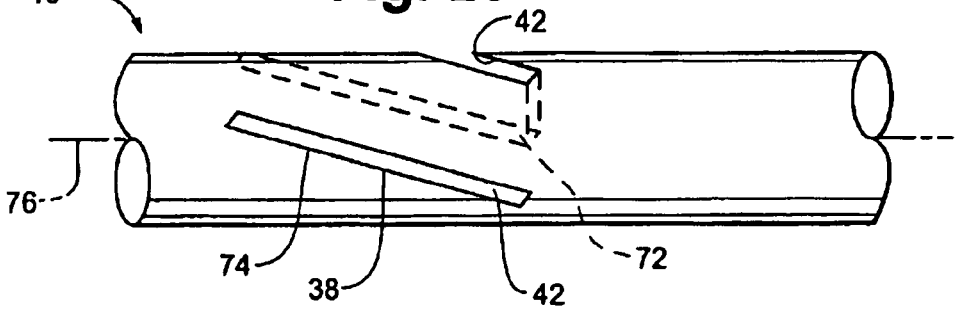
FIG. 20 is a side elevational view of the broadhead depicting another embodiment of the blade recess position.

The depiction of FIG. 20 is of another embodiment of the blade recesses 38. In this case, each blade recess 38 is a groove 74. The groove 74 is angled with respect to the longitudinal axis 76 and at any point, crosses the longitudinal axis 76.

Figure 21:
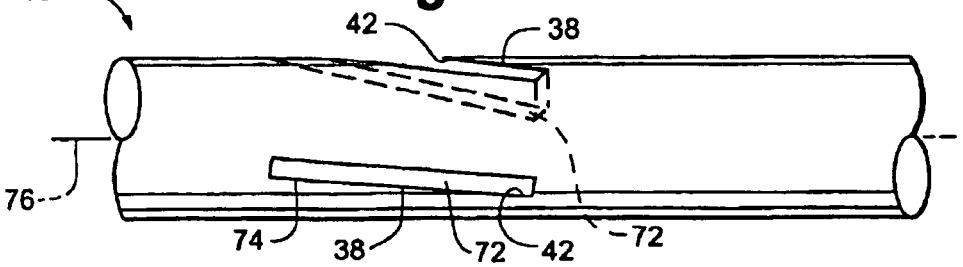
FIG. 21 is a side elevational view of a broadhead depicting an even further embodiment of the blade recess position.

The depiction of FIG. 21 illustrates a further position of the blade recesses 38. In this embodiment, each of the blade recesses 38 is a groove 74 defined in the body 32. The groove 74 has a blind bottom 72 and first inlet 42. In this case, each of the grooves 74 is angled with respect to the longitudinal axis 76 and is offset from and does not cross the longitudinal axis 76.

It will be obvious to those skilled in the art that other embodiments in addition to the ones described herein are indicated to be within the scope and breadth of the present application. Accordingly, the applicant intends to be limited only by the claims appended hereto.

What is claimed is:

[1. A broadhead for mating with an arrow, comprising:

a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming action of a blade cutting edge of each blade outward relative to the broadhead body, the respective blade recesses each being a slot having a first inlet and a second inlet disposed on either side of a bridge.]

[2. The broadhead of claim 1, each of the plurality of blades having a mass reducing retaining slot defined therein, a retaining device being disposed therein for shiftably coupling the respective blade to the broadhead body.]

3. [The broadhead of claim 2,] *A broadhead for mating with an arrow, comprising:*

*a plurality of blades shiftable between a retracted, in flight position and an extended, penetrating position, each of the blades being rearwardly longitudinally translatable from the retracted, in flight position to the extended, penetrating position, each of the blades residing at least*

*in part in a respective blade recess defined in a broadhead body when in the retracted, in flight position, longitudinal translation of the plurality of blades effecting a camming action of a blade cutting edge of each blade outward relative to the broadhead body, the respective blade recesses each being a slot having a first inlet and a second inlet disposed on either side of a bridge, wherein each of the plurality of blades have a mass reducing retaining slot defined therein, a retaining device being disposed therein for shiftably coupling the respective blade to the broadhead body, and wherein* the respective slots [being] *are* arcuate in shape.

4. [The broadhead of claim 2,] *A broadhead for mating with an arrow, comprising:*

*a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming action of a blade cutting edge of each blade outward relative to the broadhead body, the respective blade recesses each being a slot having a first inlet and a second inlet disposed on either side of a bridge, wherein each of the plurality of blades have a mass reducing retaining slot defined therein, a retaining device being disposed therein for shiftably coupling the respective blade to the broadhead body, and wherein* the respective slots [having] *have* a shape defined by a substantially straight side and by a curved side.

[5. The broadhead of claim 2, the respective slots and respective retaining devices cooperating to at least in part effecting the outward camming action of the blades during rearward longitudinal translation thereof.]

6. [The broadhead of claim 1] *A broadhead for mating with an arrow, comprising:*

*a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming action of a blade cutting edge of each blade outward relative to the broadhead body, the respective blade recesses each being a slot having a first inlet and a second inlet disposed on either side of a bridge, the broadhead further* including a tip blade operably coupled to a penetrating end of the broadhead body.

7. The broadhead of claim 6, the tip blade having a pair of cutting edges.

8. The broadhead of claim 7, the tip blade cutting edges being curved and intersecting at a leading point.

9. The broadhead of claim 7, the tip blade cutting edges extending radially outward relative to a penetrating end external margin.

[10. The broadhead of claim 1 having at least three blades.]

[11. The broadhead of claim 1, each of the blades having a camming edge operably coupled to the cutting edge and an impact edge operably coupled to the cutting edge.]

[12. The broadhead of claim 11, the respective impact edges being presented at least in part external to the broadhead body when the respective blades are in the retracted, in flight position.]

[13. The broadhead of claim 12, a rearward directed longitudinal force exerted on the portion of the respective impact edges presented external to the broadhead body acting to translate the respective blades rearwardly longitudinally to the extended, penetrating position.]

14. [The broadhead of claim 1,] *A broadhead for mating with an arrow, comprising:*

*a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming action of a blade cutting edge of each blade outward relative to the broadhead body, the respective blade recesses each being a slot having a first inlet and a second inlet disposed on either side of a bridge, and wherein* the respective blade recesses each being a groove having a first inlet and a blind bottom margin.

[15. The broadhead of claim 1, the respective blade recesses each being offset from a broadhead body longitudinal axis.]

[16. The broadhead of claim 1, the respective blade recesses each being offset from a broadhead body longitudinal axis and parallel thereto.]

17. [The broadhead of claim 1,] *A broadhead for mating with an arrow, comprising:*

*a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming action of a blade cutting edge of each blade outward relative to the broadhead body, the respective blade recesses each being a slot having a first inlet and a second inlet disposed on either side of a bridge, and wherein* the respective blade recesses *are* each [being] offset from a broadhead body longitudinal axis and angled with respect to the longitudinal axis.

18. [The broadhead of claim 1,] *A broadhead for mating with an arrow, comprising:*

*a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming action of a blade cutting edge of each blade outward relative to the broadhead body, the respective blade recesses each being a slot having a first inlet and a second inlet disposed on either side of a bridge, and wherein* the respective blade recesses *are* each [being] angled with respect to the longitudinal axis and intersecting the longitudinal axis.

[19. The broadhead of claim 1, the respective blade recesses each being radially disposed relative to a broadhead body longitudinal axis.]

[20. A method of expanding an expandable broadhead, comprising:

disposing each of a plurality of blades at least in part in a respective blade recess defined in a broadhead body when in a retracted, in flight position;

rearwardly longitudinally translating each of the blades from the retracted, in flight position to an extended, penetrating position;

effecting a camming action of a blade cutting edge of each blade outward relative to the broadhead body by means of the longitudinal translation of each of the plurality of blades; and defining a mass reducing retaining slot in each of the plurality of blades and disposing a retaining device in the respective slots for shiftably coupling the respective blade to the broadhead body.]

21. [The method of claim 20,] *A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*defining a mass reducing retaining slot in each of the plurality of blades and disposing a retaining device in the respective slots for shiftably coupling the respective blade to the broadhead body; and*

[including] forming the respective slots in an arcuate shape.

[22. The method of claim 20, including forming the respective slots in a shape defined by a substantially straight side and by a curved side.]

[23. The method of claim 20, including at least in part effecting the outward camming action of the blades during rearward longitudinal translation thereof by cooperative action of the respective slots and respective retaining devices.]

24. [The method of claim 20] *A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*defining a mass reducing retaining slot in each of the plurality of blades and disposing a retaining device in the respective slots for shiftably coupling the respective blade to the broadhead body; and*

[including] operably coupling a tip blade to a penetrating end of the broadhead body.

25. The method of claim 24, including forming a pair of cutting edges on the tip blade.

26. The method of claim 25, including forming the tip blade cutting edges curved and intersecting at a leading point.

27. The method of claim 25, including extending the tip blade cutting edges radially outward relative to a penetrating end external margin.

[28. The method of claim 20, including disposing at least three blades at least in part in a respective blade recess defined in a broadhead body.]

[29. The method of claim 20, including forming the respective blade recesses as a slot having a first inlet and a second inlet disposed on either side of a bridge.]

30. [The method of claim 20,] *A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*defining a mass reducing retaining slot in each of the plurality of blades and disposing a retaining device in the respective slots for shiftably coupling the respective blade to the broadhead body; and*

[including] forming the respective blade recesses as a groove having a first inlet and a blind bottom margin.

[31. A method of expanding an expandable broadhead, comprising:

disposing each of a plurality of blades at least in part in a respective blade recess defined in a broadhead body when in a retracted, in flight position;

rearwardly longitudinally translating each of the blades from the retracted, in flight position to an extended, penetrating position;

effecting a camming action of a blade cutting edge of each blade outward relative to the broadhead body to means of the longitudinal translation of each of the plurality of blades; and on each of the blades, defining a camming edge and operably coupling the camming edge to the cutting edge and an impact edge and operably coupling the impact edge to the cutting edge.]

[32. The method of claim 31, including presenting the respective impact edges at least in part external to the broadhead body when the respective blades are in the retracted, in flight position.]

[33. The method of claim 32, including exerting a rearward directed longitudinal force on the portion of the respective impact edges presented external to the broadhead body acting to translate the respective blades rearwardly longitudinally to the blade extended, penetrating position.]

[34. A method of expanding an expandable broadhead, comprising:

disposing each of a plurality of blades at least in part in a respective blade recess defined in a broadhead body when in a retracted, in flight position;

rearwardly longitudinally translating each of the blades from the retracted, in flight position to an extended, penetrating position;

effecting a camming action of a blade cutting edge of each blade outward relative to the broadhead body by means of the longitudinal translation of each of the plurality of blades; and forming the respective blade recesses offset from a broadhead body longitudinal axis.]

35. [The method of claim 34,] *A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*forming the respective blade recesses offset from a broadhead body longitudinal axis; and*

[including] forming the respective blade recesses offset from a broadhead body longitudinal axis and angled with respect to the longitudinal axis.

36. [The method of claim 34,] *A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*forming the respective blade recesses offset from a broadhead body longitudinal axis; and*

[including] forming the respective blade recesses angled with respect to the longitudinal axis and intersecting the longitudinal axis.

[37. The method of claim 34, including forming the respective blade recesses radially disposed relative to a broadhead body longitudinal axis.]

*38. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, and wherein a pair of blades are arranged for sliding engagement within a single recess.*

*39. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, and wherein the at least one blade recess comprises a groove with one inlet.*

*40. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the at least one blade recess is arranged at an angle with respect to the longitudinal axis.*

*41. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the penetrating end comprises a tip blade.*

*42. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the cutting surfaces on the blades are located opposite the respective camming surfaces.*

*43. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, and wherein the expandable broadhead comprises a friction member that holds the blades in the collapsed position.*

*44. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, and wherein the blades comprise an interference fit with the at least one blade recess.*

*45. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the camming surfaces comprise features that retain the blades in the expanded position.*

*46. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the blades are arranged at an angle with respect to the longitudinal axis.*

*47. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the broadhead body comprises a surface engaged with the camming surfaces on the blades during movement from the collapsed position to the expanded position.*

*48. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the camming surfaces of the blades engage a rearward portion of the recess during movement from the collapsed position to the expanded position.*

*49. An expandable broadhead comprising:*

*a broadhead body comprising a penetrating end and an arrow shaft attachment end permanently fixing relative to each other along a longitudinal axis; and*

*a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the*

*broadhead body comprises a surface engaged with the blades during movement from the collapsed position to the expanded position.*

*50. An expandable broadhead comprising:*

*a broadhead body comprising a penetrating end and an arrow shaft attachment end permanently fixing relative to each other along a longitudinal axis; and*

*a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the broadhead body comprises a surface engaged with the camming surfaces on the blades during movement from the collapsed position to the expanded position.*

*51. An expandable broadhead comprising:*

*a broadhead body comprising a penetrating end and an arrow shaft attachment end permanently fixing relative to each other along a longitudinal axis; and*

*a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear portions of the blades expanded radially outwardly relative to the broadhead body, wherein for each of the plurality of blades the camming surface is operably coupled to the cutting surface and the impact edge, and the impact edge is operably coupled to the cutting surface, wherein the camming surfaces of the blades engage a rearward portion of the recess during movement from the collapsed position to the expanded position.*

*52. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges;*

*applying a rearward force to each of the impact edges so that rear portions of the each of the respective blades expand radially outwardly relative to the broadhead body, wherein for each of the plurality of blades the camming surface is operably coupled to the cutting surface and the impact edge, and the impact edge is operably coupled to the cutting surface; and*

*arranging a pair of blades for sliding engagement within a single recess in the broadhead body.*

*53. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges;*

*applying a rearward force to each of the impact edges so that rear portions of the each of the respective blades expand radially outwardly relative to the broadhead body, wherein for each of the plurality of blades the camming surface is operably coupled to the cutting surface and the impact edge, and the impact edge is operably coupled to the cutting surface; and*

*forming at least one blade recess in the broadhead body comprising a groove with one inlet.*

*54. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges;*

*applying a rearward force to each of the impact edges so that rear portions of the each of the respective blades expand radially outwardly relative to the broadhead body, wherein for each of the plurality of blades the camming surface is operably coupled to the cutting surface and the impact edge, and the impact edge is operably coupled to the cutting surface; and*

*locating the blades in blade recesses arranged at an angle with respect to the longitudinal axis.*

*55. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges;*

*applying a rearward force to each of the impact edges so that rear portions of the each of the respective blades expand radially outwardly relative to the broadhead body, wherein for each of the plurality of blades the camming surface is operably coupled to the cutting surface and the impact edge, and the impact edge is operably coupled to the cutting surface; and*

*engaging the camming surfaces with the broadhead body during movement from the collapsed position to the expanded position.*

*56. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges;*

*applying a rearward force to each of the impact edges so that rear portions of the each of the respective blades expand radially outwardly relative to the broadhead body, wherein for each of the plurality of blades the camming surface is operably coupled to the cutting surface and the impact edge, and the impact edge is operably coupled to the cutting surface; and*

*engaging camming surfaces with rearward portion of recesses in the broadhead body during movement from the collapsed position to the expanded position.*

*57. A method of expanding an expandable broadhead, comprising the steps of:*

*permanently fixing a penetrating end and an arrow shaft attachment end on a broadhead body relative to each other along a longitudinal axis;*

*disposing each of a plurality of blades at least in part in a respective blade recess defined in the broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*on each of the blades, defining a camming edge and operably coupling the camming edge to the cutting edge and an impact edge and operably coupling the impact edge to the cutting edge; and*

*engaging the camming surfaces with rearward portions of the recesses in the broadhead body during movement from the collapsed position to the expanded position.*

*58. The method of claim 57 comprising engaging the impact edges with an object to drive each of the blades longitudinally rearward.*

*59. The method of claim 57 comprising forming elongated slots in the blades engaged with at least one feature on the broadhead body.*

*60. The method of claim 57 comprising forming the camming surfaces on the blades comprising a shape including one or more of convex, concave, straight, or a combination thereof.*

*61. The method of claim 57 comprising engaging the camming surfaces with the broadhead body during movement from the collapsed position to the expanded position.*

*62. The method of claim 57 wherein the rearward portion of the recess comprises a surface on the broadhead body.*

*63. The method of claim 57 comprising the steps of:*

*engaging the penetrating end with an object; and*

*subsequently engaging each of the impact edges with the object to commence driving the blades longitudinally rearward.*

*64. A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*on each of the blades, defining a camming edge and operably coupling the camming edge to the cutting edge and an impact edge and operably coupling the impact edge to the cutting edge; and*

*pivotally attaching the blades to the broadhead body.*

*65. A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*on each of the blades, defining a camming edge and operably coupling the camming edge to the cutting edge and an impact edge and operably coupling the impact edge to the cutting edge; and*

*engaging the camming surfaces with the broadhead body during movement from the retracted position to the penetrating position.*

*66. A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*on each of the blades, defining a camming edge and operably coupling the camming edge to the cutting edge and an impact edge and operably coupling the impact edge to the cutting edge; and*

*engaging camming surfaces with rearward portions of the respective recesses in the broadhead body during movement from the retracted position to the penetrating position.*

*67. A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position;*

*effecting a camming action of a blade cutting edge of each blade outward relative to the broadhead body by means of the longitudinal translation of each of the plurality of blades;*

*on each of the blades, defining a camming edge and operably coupling the camming edge to the cutting edge and an impact edge and operably coupling the impact edge to the cutting edge; and*

*engaging the camming edges on the blades with the expandable broadhead during movement from the retracted position to the penetrating position.*

*68. An expandable broadhead comprising:*

*at least one blade including a slot located at least in part in a blade recess on a broadhead body in a retracted, in flight position;*

*at least one retaining device extending through the slot, coupling the blade to the broadhead body, such that upon impact of the expandable broadhead with an object the blade translates rearwardly relative to the broadhead body and the retaining device slides in the slot and a rear end of the blade moves radially outward to an extended, penetrating position; and*

*a feature on the blade adapted to retain the blade in the retracted, in flight position.*

*69. An expandable broadhead comprising:*

*at least one blade including a slot located at least in part in a blade recess on a broadhead body in a retracted, in flight position;*

*at least one retaining device extending through the slot, coupling the blade to the broadhead body, such that upon impact of the expandable broadhead with an object the blade translates rearwardly relative to the broadhead body and the retaining device slides in the slot and a rear end of the blade moves radially outward to an extended, penetrating position; and*

*a feature on the blade adapted to retain the blade in the extended, penetrating position.*

*70. An expandable broadhead comprising:*

*at least one blade including a slot located at least in part in a blade recess on a broadhead body in a retracted, in flight position;*

*at least one retaining device extending through the slot, coupling the blade to the broadhead body, such that upon impact of the expandable broadhead with an object the blade translates rearwardly relative to the broadhead body and the retaining device slides in the slot and a rear end of the blade moves radially outward to an extended, penetrating position; and*

*a tip blade coupled to a penetrating end of the expandable broadhead.*

*71. A method of expanding an expandable broadhead, comprising:*

*locating at least one blade at least in part in a blade recess in a broadhead body in a retracted, in flight position, a retaining device extending through a slot in the blade coupling the blade to the broadhead body;*

*rearwardly translating the blade in the blade recess relative to the broadhead body in response to the expandable broadhead impacting an object, so that the retaining device slides in the slot;*

*moving a rear end of the blade radially outward from a groove to an extended, penetrating position during rearward translation; and*

*engaging a feature on the blade to retain the blade in the retracted, in flight position.*

*72. A method of expanding an expandable broadhead, comprising:*

*locating at least one blade at least in part in a blade recess in a broadhead body in a retracted, in flight position, a retaining device extending through a slot in the blade coupling the blade to the broadhead body;*

*rearwardly translating the blade in the blade recess relative to the broadhead body in response to the expandable broadhead impacting an object, so that the retaining device slides in the slot;*

*moving a rear end of the blade radially outward from a groove to an extended, penetrating position during rearward translation; and*

*engaging a feature on the blade to retain the blade in the extended, penetrating position.*

*73. A method of expanding an expandable broadhead, comprising:*

*locating at least one blade at least in part in a blade recess in a broadhead body in a retracted, in flight position, a retaining device extending through a slot in the blade coupling the blade to the broadhead body;*

*rearwardly translating the blade in the blade recess relative to the broadhead body in response to the expandable broadhead impacting an object, so that the retaining device slides in the slot;*

*moving a rear end of the blade radially outward from a groove to an extended, penetrating position during rearward translation; and*

*coupling a penetrating portion to a forward end of the broadhead body.*

*74. A method of expanding an expandable broadhead, comprising:*

*disposing at least one blade at least in part in a blade recess in a broadhead body when in a retracted, in flight position;*

*rearwardly translating the blade from the retracted, in flight position to an extended, penetrating position in response to the expandable broadhead impacting an object;*

*effecting a camming action of a cutting edge of the blade outward relative to the broadhead body by longitudinally translating the blade;*

*defining a mass reducing retaining slot in the blade and disposing a retaining device in the slot to slidably couple the blade to the broadhead body;*

*driving the at least one blade longitudinally rearward when the expandable broadhead engages with the object; and*

*coupling a tip blade to a forward end of the expandable broadhead.*

*75. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edge exposed from the blade recess, and an expanded position with the impact edge rearwardly disposed and rear portions of the blades expanded radially outwardly relative to the broadhead body, wherein for each of the plurality of blades the camming surface is positioned substantially opposite the cutting surface, and the impact edge is operably coupled to the cutting surface.*

*76. An expandable broadhead comprising:*

*a broadhead body comprising a penetrating end and an arrow shaft attachment end permanently fixing relative to each other along a longitudinal axis; and*

*a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly*

*disposed and at least the impact edge exposed from the broadhead body, and an expanded position with the impact edge rearwardly disposed and rear portions of the blades expanded radially outwardly relative to the broadhead body, wherein for each of the plurality of blades the camming surface is positioned substantially opposite the cutting surface, and the impact edge is operably coupled to the cutting surface.*

*77. An expandable broadhead comprising:*

*a broadhead body comprising a penetrating end and an arrow shaft attachment end permanently fixing relative to each other along a longitudinal axis; and*

*a plurality of blades each comprising an outwardly directed cutting surface, a camming surface, and an impact edge, each of the plurality of blades are arranged to slide relative to the broadhead body between a collapsed position with the blades forwardly disposed and generally aligned with the longitudinal axis, and an expanded position wherein each of the blades are adapted to be driven longitudinally rearward when the respective impact edges engage an object, wherein for each of the plurality of blades the camming surface is positioned substantially opposite the cutting surface, and the impact edge is operably coupled to the cutting surface.*

*78. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges; and*

*applying a rearward force to each of the impact edges so that rear portions of the each of the respective blades expand radially outwardly relative to the broadhead body, wherein for each of the plurality of blades the camming surface is positioned substantially opposite the cutting surface, and the impact edge is operably coupled to the cutting surface.*

* * * * *

UNITED STATES PATENT AND TRADEMARK OFFICE

CERTIFICATE OF CORRECTION

PATENT NO. : RE44,144 C1
APPLICATION NO. : 90/012839
DATED : December 16, 2013
INVENTOR(S) : Bruce Barrie et al.

It is certified that error appears in the above-identified patent and that said Letters Patent is hereby corrected as shown below:

In the Claims

In the Ex Parte Reexamination Certificate, at column 1, line number 30, insert the following amended and new claims:

--21. [The method of claim 20,] *A method of expanding an expandable broadhead, comprising:*
*disposing each of a plurality of blades at least in part in a respective blade recess defined in a broadhead body when in a retracted, in flight position;*
*rearwardly longitudinally translating each of the blades from the retracted, in flight position to an extended, penetrating position* such that a rear end of each of the plurality of blades moves radially outward in a same direction as a blade cutting edge of the blade*;*
*effecting a camming action of* [[*a*]] the *blade cutting edge of each blade outward relative to the broadhead body by means of the longitudinal translation of each of the plurality of blades;*
*defining a mass reducing retaining slot in each of the plurality of blades and disposing a retaining device in the respective slots for shiftably coupling the respective blade to the broadhead body; and*
[including] forming the respective slots in an arcuate shape.

24. [The method of claim 20] *A method of expanding an expandable broadhead, comprising:*
*disposing each of a plurality of blades at least in part in a respective blade recess defined in a broadhead body when in a retracted, in flight position;*
*rearwardly longitudinally translating each of the blades from the retracted, in flight position to an extended, penetrating position* such that a rear end of each of the plurality of blades moves radially outward in a same direction as a blade cutting edge of the blade*;*
*effecting a camming action of* [[*a*]] the *blade cutting edge of each blade outward relative to the broadhead body by means of the longitudinal translation of each of the plurality of blades;*
*defining a mass reducing retaining slot in each of the plurality of blades and disposing a retaining device in the respective slots for shiftably coupling the respective blade to the broadhead body; and*

Signed and Sealed this
Fourth Day of March, 2014

Michelle K. Lee

Michelle K. Lee
*Deputy Director of the United States Patent and Trademark Office*

[including] operably coupling a tip blade to a penetrating end of the broadhead body.

30. [The method of claim 20,] *A method of expanding an expandable broadhead, comprising:*
*disposing each of a plurality of blades at least in part in a respective blade recess defined in a broadhead body when in a retracted, in flight position;*
*rearwardly longitudinally translating each of the blades from the retracted, in flight position to an extended, penetrating position* such that a rear end of each of the plurality of blades moves radially outward in a same direction as a blade cutting edge of the blade*;*
*effecting a camming action of* [[*a*]] the *blade cutting edge of each blade outward relative to the broadhead body by means of the longitudinal translation of each of the plurality of blades;*
*defining a mass reducing retaining slot in each of the plurality of blades and disposing a retaining device in the respective slots for shiftably coupling the respective blade to the broadhead body; and*
[including] forming the respective blade recesses as a groove having a first inlet and a blind bottom margin.

35. [The method of claim 34,] *A method of expanding an expandable broadhead, comprising:*
*disposing each of a plurality of blades at least in part in a respective blade recess defined in a broadhead body when in a retracted, in flight position;*
*rearwardly longitudinally translating each of the blades from the retracted, in flight position to an extended, penetrating position* such that a rear end of each of the plurality of blades moves radially outward in a same direction as a blade cutting edge of the blade*;*
*effecting a camming action of* [[*a*]] the *blade cutting edge of each blade outward relative to the broadhead body by means of the longitudinal translation of each of the plurality of blades;*
*forming the respective blade recesses offset from a broadhead body longitudinal axis; and*
[including] forming the respective blade recesses offset from a broadhead body longitudinal axis and angled with respect to the longitudinal axis.

*38. An expandable broadhead comprising:*
*a broadhead body comprising a penetrating end located along a longitudinal axis and at least one blade recess; and*
*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, and wherein a pair of blades are arranged for sliding engagement within a single recess.*

*39. An expandable broadhead comprising:*
*a broadhead body comprising a penetrating end located along a longitudinal axis and at least one*

*blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, and wherein the at least one blade recess comprises a groove with one inlet.*

*40. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the at least one blade recess is arranged at an angle with respect to the longitudinal axis.*

*41. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the penetrating end comprises a tip blade.*

*42. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the cutting surfaces on the blades are located opposite the respective camming surfaces.*

*43. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, and wherein the expandable broadhead comprises a friction member that holds the blades in the collapsed position.*

*44. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, and wherein the blades comprise an interference fit with the at least one blade recess.*

*45. An expandable broadhead comprising:*

*a broadhead body comprising a penetrating end located along a longitudinal axis and at least one blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the camming surfaces comprise features that retain the blades in the expanded position.*

*46. An expandable broadhead comprising:*
*a broadhead body comprising a penetrating end located along a longitudinal axis and at least one blade recess; and*
*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the blades are arranged at an angle with respect to the longitudinal axis.*

*47. An expandable broadhead comprising:*
*a broadhead body comprising a penetrating end located along* a *longitudinal axis and at least one blade recess; and*
*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade *wherein for each of the plurality of blades the camming surface is operably coupled to the cutting surface and the impact edge, and the impact edge is operably coupled to the cutting surface, wherein the broadhead body comprises a surface engaged with the camming surfaces on the blades during movement from the collapsed position to the expanded position.*

*48. An expandable broadhead comprising:*
*a broadhead body comprising a penetrating end located along a longitudinal axis and at least one*

*blade recess; and*

*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the camming surfaces of the blades engage a rearward portion of the recess during movement from the collapsed position to the expanded position.*

*49. An expandable broadhead comprising:*

*a broadhead body comprising a penetrating end and an arrow shaft attachment end permanently fixing relative to each other along a longitudinal axis;*

*and a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the broadhead body comprises a surface engaged with the blades during movement from the collapsed position to the expanded position.*

*50. An expandable broadhead comprising:*

*a broadhead body comprising a penetrating end and an arrow shaft attachment end permanently fixing relative to each other along a longitudinal axis; and*

*a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the broadhead body comprises a surface engaged with the camming surfaces on the blades*

*during movement from the collapsed position to the expanded position.*

*51. An expandable broadhead comprising:*
*a broadhead body comprising a penetrating end and an arrow shaft attachment end permanently fixing relative to each other along a longitudinal axis; and*
*a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface, wherein the camming surfaces of the blades engage a rearward portion of the recess during movement from the collapsed position to the expanded position.*

*52. A method of expanding an expandable broadhead, comprising the steps of:*
*permanently fixing a penetrating end and an arrow shaft attachment end on a broadhead body relative to each other along a longitudinal axis;*
*engaging each of a plurality of blades for sliding engagement with the broadhead body generally along the longitudinal axis;*
*arranging the plurality of blades generally along the longitudinal axis in a collapsed position, the blades comprising outwardly directed cutting surfaces, camming surfaces, and forwardly oriented impact edges;*
*applying a rearward force to each of the impact edges so that rear portions of the each of the respective blades expand radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and*
*the impact edge is operably coupled to the cutting surface; and*
*arranging a pair of blades for sliding engagement within a single recess in the broadhead body.*

*53. A method of expanding an expandable broadhead, comprising the steps of:*
*permanently fixing a penetrating end and an arrow shaft attachment end on a broadhead body relative to each other along a longitudinal axis;*
*engaging each of a plurality of blades for sliding engagement with the broadhead body generally along the longitudinal axis;*
*arranging the plurality of blades generally along the longitudinal axis in a collapsed position, the blades comprising outwardly directed cutting surfaces, camming surfaces, and forwardly oriented impact edges;*
*applying a rearward force to each of the impact edges so that rear portions of the each of the respective blades expand radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface; and*

*forming at least one blade recess in the broadhead body comprising a groove with one inlet.*

*54. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges;*

*applying a rearward force to each of the impact edges so that rear portions of the each of the respective blades expand radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface; and*

*locating the blades in blade recesses arranged at an angle with respect to the longitudinal axis.*

*55. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly oriented impact edges;*

*applying a rearward force to each of the impact edges so that rear portions of the each of the respective blades expand radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface; and*

*engaging the camming surfaces with the broadhead body during movement from the collapsed position to the expanded position.*

*56. A method of expanding an expandable broadhead, comprising the steps of:*

*permanently fixing a penetrating end and an arrow shaft attachment end on a broadhead body relative to each other along a longitudinal axis;*

*engaging each of a plurality of blades for sliding engagement with the broadhead body generally along the longitudinal axis;*

*arranging the plurality of blades generally along the longitudinal axis in a collapsed position, the blades comprising outwardly directed cutting surfaces, camming surfaces, and forwardly*

*oriented impact edges;*

*applying a rearward force to each of the impact edges so that rear portions of the each of the respective blades expand radially outwardly relative to the broadhead body,* wherein the rear portion of each of the plurality of blades expands radially outwards in a same direction as the cutting surface of the blade, *wherein for each of the plurality of blades the camming surface is operably coupled to the cutting surface and the impact edge, and the impact edge is operably coupled to the cutting surface; and*

*engaging camming surfaces with rearward portion of recesses in the broadhead body during movement from the collapsed position to the expanded position.*

57. *A method of expanding an expandable broadhead, comprising the steps of:*

*permanently fixing a penetrating end and an arrow shaft attachment end on a broadhead body relative to each other along a longitudinal axis;*

*disposing each of a plurality of blades at least in part in a respective blade recess defined in the broadhead body when in a retracted, in flight position;*

*rearwardly longitudinally translating each of the blades from the retracted, in flight position to an extended, penetrating position* such that a rear end of each of the plurality of blades moves radially outward in a same direction as a blade cutting edge of the blade*;*

*effecting a camming action of* [[*a*]] the *blade cutting edge of each blade outward relative to the broadhead body by means of the longitudinal translation of each of the plurality of blades;*

*on each of the blades, defining a camming edge and operably coupling the camming edge to the cutting edge and an impact edge and operably coupling the impact edge to the cutting edge; and*

*engaging the camming surfaces with rearward portions of the recesses in the broadhead body during movement from the collapsed position to the expanded position.*

*64. A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position* such that a rear end of each of the plurality of blades moves radially outward in a same direction as a blade cutting edge of the blade*;*

*effecting a camming action of* [[*a*]] the *blade cutting edge of each blade outward relative to the broadhead body by means of the longitudinal translation of each of the plurality of blades;*

*on each of the blades, defining a camming edge and operably coupling the camming edge to the cutting edge and an impact edge and operably coupling the impact edge to the cutting edge; and*

*pivotally attaching the blades to the broadhead body.*

*65. A method of expanding an expandable broadhead, comprising:*

*disposing each of a plurality of blades at least in part in a respective blade recess defined in a broadhead body when in a retracted, in flight position;*

*rearwardly longitudinally translating each of the blades from the retracted, in flight position to an extended, penetrating position* such that a rear end of each of the plurality of blades moves radially outward in a same direction as a blade cutting edge of the blade*;*

*effecting a camming action of* [[*a*]] the *blade cutting edge of each blade outward relative to the broadhead body by means of the longitudinal translation of each of the plurality of blades;*
*on each of the blades, defining a camming edge and operably coupling the camming edge to the cutting edge and an impact edge and operably coupling the impact edge to the cutting edge; and*
*engaging the camming surfaces with the broadhead body during movement from the retracted position to the penetrating position.*

66. *A method of expanding an expandable broadhead, comprising:*
*disposing each of a plurality of blades at least in part in a respective blade recess defined in a broadhead body when in a retracted, in flight position;*
*rearwardly longitudinally translating each of the blades from the retracted, in flight position to an extended, penetrating position* such that a rear end of each of the plurality of blades moves radially outward in a same direction as a blade cutting edge of the blade*;*
*effecting a camming action of* [[*a*]] the *blade cutting edge of each blade outward relative to the broadhead body by means of the longitudinal translation of each of the plurality of blades;*
*on each of the blades, defining a camming edge and operably coupling the camming edge to the cutting edge and an impact edge and operably coupling the impact edge to the cutting edge; and*
*engaging camming surfaces with rearward portions of the respective recesses in the broadhead body during movement from the retracted position to the penetrating position.*

*67. A method of expanding an expandable broadhead, comprising:*
*disposing each of a plurality of blades at least in part in a respective blade recess defined in a broadhead body when in a retracted, in flight position;*
*rearwardly longitudinally translating each of the blades from the retracted, in flight position to an extended, penetrating position* such that a rear end of each of the plurality of blades moves radially outward in a same direction as a blade cutting edge of the blade*;*
*effecting a camming action of* [[*a*]] the *blade cutting edge of each blade outward relative to the broadhead body by means of the longitudinal translation of each of the plurality of blades;*
*on each of the blades, defining a camming edge and operably coupling the camming edge to the cutting edge and an impact edge and operably coupling the impact edge to the cutting edge; and*
*engaging the camming edges on the blades with the expandable broadhead during movement from the retracted position to the penetrating position.*

*68. An expandable broadhead comprising:*
*at least one blade including a slot located at least in part in a blade recess on a broadhead body in a retracted, in flight position;*
*at least one retaining device extending through the slot, coupling the blade to the broadhead body, such that upon impact of the expandable broadhead with an object the blade translates rearwardly relative to the broadhead body and the retaining device slides in the slot and a rear end of the blade moves radially outward* in a same direction as a cutting edge of the blade *to an extended, penetrating position; and*
*a feature on the blade adapted to retain the blade in the retracted, in flight position.*

*69. An expandable broadhead comprising:*
*at least one blade including a slot located at least in part in a blade recess on a broadhead body in a retracted, in flight position;*
*at least one retaining device extending through the slot, coupling the blade to the broadhead body, such that upon impact of the expandable broadhead with an object the blade translates rearwardly relative to the broadhead body and the retaining device slides in the slot and a rear end of the blade moves radially outward* in a same direction as a cutting edge of the blade *to an extended, penetrating position; and*
*a feature on the blade adapted to retain the blade in the extended, penetrating position.*

*70. An expandable broadhead comprising:*
*at least one blade including a slot located at least in part in a blade recess on a broadhead body in a retracted, in flight position;*
*at least one retaining device extending through the slot, coupling the blade to the broadhead body, such that upon impact of the expandable broadhead with an object the blade translates rearwardly relative to the broadhead body and the retaining device slides in the slot and a rear end of the blade moves radially outward* in a same direction as a cutting edge of the blade *to an extended, penetrating position; and*
*a tip blade coupled to a penetrating end of the expandable broadhead.*

*71. A method of expanding an expandable broadhead, comprising:*
*locating at least one blade at least in part in a blade recess in a broadhead body in a retracted, in flight position, a retaining device extending through a slot in the blade coupling the blade to the broadhead body;*
*rearwardly translating the blade in the blade recess relative to the broadhead body in response to the expandable broadhead impacting an object, so that the retaining device slides in the slot;*
*moving a rear end of the blade radially outward* in a same direction as a cutting edge of the blade *from a groove to an extended, penetrating position during rearward translation; and*
*engaging* a *feature on the blade to retain the blade in the retracted, in flight position.*

*72. A method of expanding an expandable broadhead, comprising:*
*locating at least one blade at least in part in a blade recess in a broadhead body in a retracted, in flight position, a retaining device extending through a slot in the blade coupling the blade to the broadhead body;*
*rearwardly translating the blade in the blade recess relative to the broadhead body in response to the expandable broadhead impacting an object, so that the retaining device slides in the slot;*
*moving a rear end of the blade radially outward* in a same direction as a cutting edge of the blade *from a groove to an extended, penetrating position during rearward translation; and*
*engaging a feature on the blade to retain the blade in the extended, penetrating position.*

*73. A method of expanding an expandable broadhead, comprising:*
*locating at least one blade at least in part in a blade recess in a broadhead body in a retracted, in flight position, a retaining device extending through a slot in the blade coupling the blade to the broadhead body;*
*rearwardly translating the blade in the blade recess relative to the broadhead body in response to the*

*expandable broadhead impacting an object, so that the retaining device slides in the slot;*
*moving a rear end of the blade radially outward* in a same direction as a cutting edge of the blade *from a groove to an extended, penetrating position during rearward translation; and*
*coupling a penetrating portion to a forward end of the broadhead body.*

*74. A method of expanding an expandable broadhead, comprising:*
*disposing at least one blade at least in part in a blade recess in a broadhead body when in a retracted, in flight position;*
*rearwardly translating the blade from the retracted, in flight position to an extended, penetrating position in response to the expandable broadhead impacting an object;*
*effecting a camming action of a cutting edge of the blade outward relative to the broadhead body by longitudinally translating the blade* such that a rear end of the blade moves radially outward in a same direction as a cutting edge of the blade*;*
*defining a mass reducing retaining slot in the blade and disposing a retaining device in the slot to slidably couple the blade to the broadhead body;*
*driving the at least one blade longitudinally rearward when the expandable broadhead engages with the object; and*
*coupling a tip blade to a forward end of the expandable broadhead.*

*75. An expandable broadhead comprising:*
*a broadhead body comprising a penetrating end located along a longitudinal axis and at least one blade recess; and*
*a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edge exposed from the blade recess, and an expanded position with the impact edge rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is positioned substantially opposite the cutting surface, and the impact edge is operably coupled to the cutting surface.*

*76. An expandable broadhead comprising:*
*a broadhead body comprising a penetrating end and an arrow shaft attachment end permanently fixing relative to each other along a longitudinal axis; and*
*a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear portions of the blades expanded radially outwardly relative to the broadhead body,* wherein the rear portion of each of the plurality of blades expands radially outwards in a same direction as the cutting surface of the blade, *wherein for each of the plurality of blades the camming surface is positioned substantially opposite the cutting*

*surface, and the impact edge is operably coupled to the cutting surface.*

*77. An expandable broadhead comprising:*
*a broadhead body comprising a penetrating end and an arrow shaft attachment end permanently fixing relative to each other along a longitudinal axis; and*
*a plurality of blades each comprising an outwardly directed cutting surface, a camming surface, and an impact edge, each of the plurality of blades are arranged to slide relative to the broadhead body between a collapsed position with the blades forwardly disposed and generally aligned with the longitudinal axis, and an expanded position wherein each of the blades are adapted to be driven longitudinally rearward when the respective impact edges engage an object,* wherein a rear portion of each of the plurality of blades expands radially outwards in a same direction as the cutting surface of the blade, *wherein for each of the plurality of blades the camming surface is positioned substantially opposite the cutting surface, and the impact edge is operably coupled to the cutting surface.*

*78. A method of expanding an expandable broadhead, comprising the steps of:*
*permanently fixing a penetrating end and an arrow shaft attachment end on a broadhead body relative to each other along a longitudinal axis;*
*engaging each of a plurality of blades for sliding engagement with the broadhead body generally along the longitudinal axis;*
*arranging the plurality of blades generally along the longitudinal axis in a collapsed position, the blades comprising outwardly directed cutting surfaces, camming surfaces, and forwardly oriented impact edges; and*
*applying a rearward force to each of the impact edges so that rear portions of the each of the respective blades expand radially outwardly relative to the broadhead body,* wherein the rear portion of each of the plurality of blades expands radially outwards in a same direction as the cutting surface of the blade, *wherein for each of the plurality of blades the camming surface is positioned substantially opposite the cutting surface, and the impact edge is operably coupled to the cutting surface.*

79. An expandable broadhead comprising:
a broadhead body comprising a penetrating end located along a longitudinal axis and at least one blade recess; and
a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein an entire length of said cutting surface is positioned external to said broadhead body in the expanded position, wherein for each of the plurality of blades the camming surface is operably coupled to the cutting surface and the impact edge, and the impact edge is operably coupled to the cutting surface, and wherein the at least one blade recess comprises a groove with one inlet.

80. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, the impact edge is operably coupled to the cutting surface, and the impact edge is exposed from the blade recess in the collapsed position approximately 180 degrees around the broadhead body from where the rear potion of the blade expands radially outward in the expanded position, and wherein a pair of blades are arranged for sliding engagement within a single recess.

81. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear portions of the blades expanded radially outwardly relative to the broadhead body, wherein for each of the plurality of blades the camming surface is operably coupled to the cutting surface and the impact edge, the impact edge is operably coupled to the cutting surface, and the impact edge is exposed from the blade recess in the collapsed position approximately 120 degrees around the broadhead body from where the rear portion of the blade expands radially outward in the expanded position, wherein the cutting surfaces on the blades are located opposite the respective camming surfaces.

82. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, and wherein a pair of blades are arranged for sliding engagement within a single recess.

83. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, and wherein the at least one blade recess comprises a groove with one inlet.

84. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the at least one blade recess is arranged at an angle with respect to the longitudinal axis.

85. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the penetrating end comprises a tip blade.

86. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the cutting surfaces on the blades are located opposite the respective camming surfaces.

87. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, and wherein the expandable broadhead comprises a friction member that holds the blades in the collapsed position.

88. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, and wherein the blades comprise an interference fit with the at least one blade recess.

89. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the camming surfaces comprise features that retain the blades in the expanded position.

90. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the blades are arranged at an angle with respect to the longitudinal axis.

91. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the broadhead body comprises a surface engaged with the camming surfaces on the blades during movement from the collapsed position to the expanded position.

92. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edges exposed from the blade recess, and an expanded position with the impact edges rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the camming surfaces of the blades engage a rearward portion of the recess during movement from the collapsed position to the expanded position.

93. An expandable broadhead comprising:
a broadhead body comprising a penetrating end and an arrow shaft attachment end permanently fixing relative to each other along a longitudinal axis; and
a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the broadhead body comprises a surface engaged with the blades during movement from the collapsed position to the expanded position.

94. An expandable broadhead comprising:
a broadhead body comprising a penetrating end and an arrow shaft attachment end permanently fixing relative to each other along a longitudinal axis; and
a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the broadhead body comprises a surface engaged with the camming surfaces on the blades during movement from the collapsed position to the expanded position.

95. An expandable broadhead comprising:
a broadhead body comprising a penetrating end and an arrow shaft attachment end permanently fixing relative to each other along a longitudinal axis; and
a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear ends of the blades expanded radially outwardly relative to the broadhead body, wherein for each of the plurality of blades the camming surface is operably coupled to the cutting surface and the impact edge, and the impact edge is operably coupled to the cutting surface, wherein the camming surfaces of the blades engage a rearward portion of the recess during movement from the collapsed position to the expanded position.

96. An expandable broadhead comprising:

a broadhead body comprising a penetrating end located along a longitudinal axis and at least one blade recess; and a plurality of blades each comprising an outwardly directed cutting surface, a camming surface, and an impact edge, each of the plurality of blades arranged to slide relative to the broadhead body generally along the longitudinal axis between a collapsed position with the blades forwardly disposed and at least the impact edge exposed from the blade recess, and an expanded position with the impact edge rearwardly disposed and rear ends of the blades expanded radially outwardly relative to the broadhead body, wherein for each of the plurality of blades the camming surface is positioned substantially opposite the cutting surface, and the impact edge is operably coupled to the cutting surface.

97. An expandable broadhead comprising:

a broadhead body comprising a penetrating end and an arrow shaft attachment end permanently fixing relative to each other along a longitudinal axis; and a plurality of blades each comprising an outwardly directed cutting surface, a camming surface, and an impact edge, each of the plurality of blades arranged for sliding engagement with the broadhead body, wherein the blades slide generally along the longitudinal axis, between a collapsed position with the blades forwardly disposed and at least the impact edge exposed from the broadhead body, and an expanded position with the impact edge rearwardly disposed and rear ends of the blades expanded radially outwardly relative to the broadhead body, wherein for each of the plurality of blades the camming surface is positioned substantially opposite the cutting surface, and the impact edge is operably coupled to the cutting surface.

98. A method of expanding an expandable broadhead, comprising the steps of:

permanently fixing a penetrating end and an arrow shaft attachment end on a broadhead body relative to each other along a longitudinal axis;

engaging each of a plurality of blades for sliding engagement with the broadhead body generally along the longitudinal axis;

arranging the plurality of blades generally along the longitudinal axis in a collapsed position, the blades comprising outwardly directed cutting surfaces, camming surfaces, and forwardly oriented impact edges; and applying a rearward force to each of the impact edges so that rear ends of each of the respective blades expand radially outwardly relative to the broadhead body, wherein for each of the plurality of blades the camming surface is positioned substantially opposite the cutting surface, and the impact edge is operably coupled to the cutting surface.--

US00RE44144C1

(12) EX PARTE REEXAMINATION CERTIFICATE (9985th)

United States Patent

Barrie et al.

(10) Number: US RE44,144 C1

(45) Certificate Issued: Dec. 16, 2013

(54) EXPANDABLE BROADHEAD

(75) Inventors: Bruce Barrie, Waseca, MN (US); Ronald E. Way, Scottsdale, AZ (US); Carl J. Pugliese, Chandler, AZ (US)

(73) Assignee: Fifth Third Bank, Cincinnati, OH (US)

Reexamination Request:
No. 90/012,839, Apr. 15, 2013

Reexamination Certificate for:

| | |
|---|---|
| Patent No.: | **Re. 44,144** |
| Issued: | **Apr. 9, 2013** |
| Appl. No.: | **11/823,458** |
| Filed: | **Jun. 27, 2007** |

Related U.S. Patent Documents

Reissue of:

| | |
|---|---|
| (64) Patent No.: | **6,910,979** |
| Issued: | **Jun. 28, 2005** |
| Appl. No.: | **10/688,542** |
| Filed: | **Oct. 17, 2003** |

Related U.S. Application Data

(60) Continuation-in-part of application No. 10/601,681, filed on Jun. 23, 2003, now abandoned, which is a continuation-in-part of application No. 10/233,341, filed on Sep. 3, 2002, now Pat. No. 6,626,776, which is a division of application No. 09/798,578, filed on Mar. 3, 2001, now Pat. No. 6,517,454.

(60) Provisional application No. 60/188,683, filed on Mar. 13, 2000.

(51) Int. Cl.
*F42B 6/08* (2006.01)

(52) U.S. Cl.
USPC ..... 473/583; 473/584

(58) Field of Classification Search
None
See application file for complete search history.

(56) References Cited

To view the complete listing of prior art documents cited during the proceeding for Reexamination Control Number 90/012,839, please refer to the USPTO's public Patent Application Information Retrieval (PAIR) system under the Display References tab.

*Primary Examiner* — Jeffrey R Jastrzab

(57) ABSTRACT

A broadhead for mating with an arrow, includes a plurality of blades shiftable between a retracted, in flight position and an extended, penetrating position, each of the blades being rearwardly longitudinally translatable from the retracted, in flight position to the extended, penetrating position, each of the blades residing at least in part in a respective blade recess defined in a broadhead body when in the retracted, in flight position, longitudinal translation of the plurality of blades effecting a camming of a blade cutting edge of each blade outward relative to the broadhead body. A method of expanding an expandable broadhead is also included.

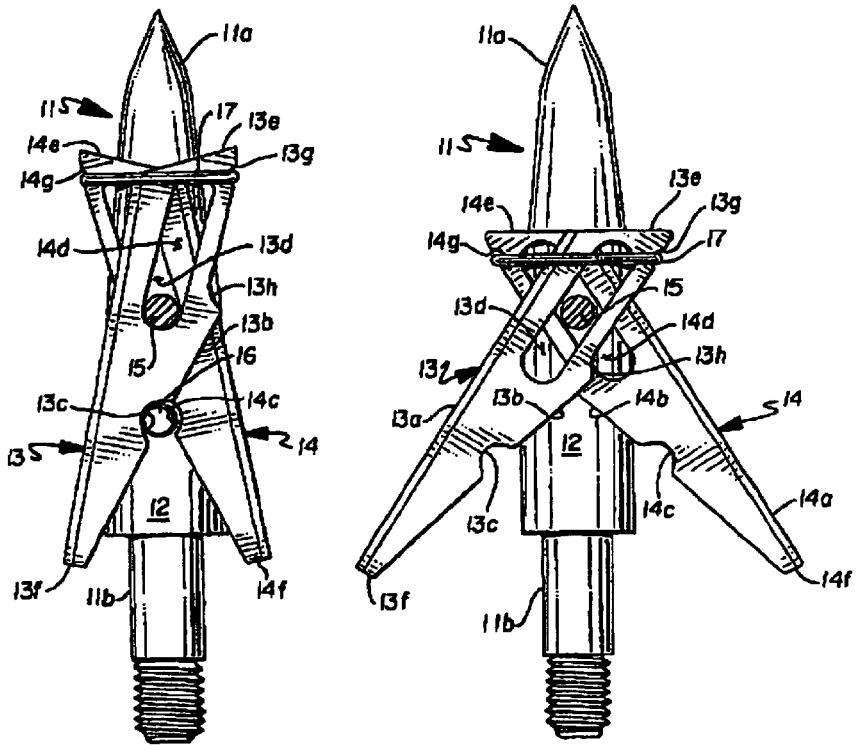

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 3, 4, 6-9, 14, 17, 18 and 36 is confirmed.

Claims 1, 2, 5, 10-13, 15, 16, 19, 20, 22, 23, 28, 29, 31-34 and 37 were previously cancelled.

Claims 21, 24, 30, 35, 38-57 and 64-78 are determined to be patentable as amended.

Claims 25-27 and 58-63, dependent on an amended claim, are determined to be patentable.

New claims 79-98 are added and determined to be patentable.

* * * * *